United States Patent [19]

Kregness et al.

[11] Patent Number: 4,556,978
[45] Date of Patent: Dec. 3, 1985

[54] ERROR CHECKED HIGH SPEED SHIFT MATRIX

[75] Inventors: Glen R. Kregness, Minnetonka; Peter B. Criswell, Bethel; Clarence W. DeKarske, St. Paul Park, all of Minn.

[73] Assignee: Sperry Corporation, New York, N.Y.

[21] Appl. No.: 515,401

[22] Filed: Jul. 20, 1983

[51] Int. Cl.⁴ .............................................. G06F 11/10
[52] U.S. Cl. ...................................... 371/49; 364/738; 364/900
[58] Field of Search .................... 371/49, 51; 364/738, 364/200, 900

[56] References Cited

U.S. PATENT DOCUMENTS

| | | | |
|---|---|---|---|
| 4,131,940 | 12/1978 | Moyer | 364/200 |
| 4,348,742 | 9/1982 | O'Brien | 364/900 |
| 4,462,102 | 7/1984 | Povlick | 371/49 |
| 4,484,259 | 11/1984 | Palmer et al. | 364/736 X |

OTHER PUBLICATIONS

Schaughency, Partial Parity Predict for CPU Having Architectural Rotate and Mask/Merge Unit, IBM Tech. Discl. Bulletin, vol. 23, No. 9, Feb. 1981, pp. 4126–4127.

Cash et al., N-Chip Cascadable Shift Register with Parity Predictor, IBM Tech. Discl. Bulletin, vol. 20, No. 4, Sep. 1977, pp. 1544–1547.

Primary Examiner—Charles E. Atkinson
Attorney, Agent, or Firm—Charles A. Johnson; Kenneth T. Grace; Marshall M. Truex

[57] ABSTRACT

A 72-bit shift matrix, suitable for LSI implementation in gate arrays, is disclosed. Eight byte shifters and eight bit shifters are combined to produce shifts of 0–72 places in either direction, circularly or open ended with zero or sign fill. A means is additionally provided to regenerate original source parity from the matrix outputs for use in thru checking. A single 9-bit parity generator is all that is required to check the correctness of the matrix.

17 Claims, 22 Drawing Figures

| BYTE COUNT | RIGHT SHIFT SELECTION | | | CONVERTED LEFT COUNT | LEFT SHIFT SELECTION | | |
|---|---|---|---|---|---|---|---|
| $2^6\ 2^5\ 2^4\ 2^3$ | RANK 1 | RANK 2 | RANK 3 | $2^6\ 2^5\ 2^4\ 2^3$ | RANK 1 | RANK 2 | RANK 3 |
| 0 0 0 0 | 0 | 0 | 0 | 1 0 0 1 | 0 | 8 | 64 |
| 0 0 0 1 | 0 | 8 | 0 | 1 0 0 0 | 0 | 0 | 64 |
| 0 0 1 0 | 16 | 0 | 0 | 0 1 1 1 | 16 | 8 | 32 |
| 0 0 1 1 | 16 | 8 | 0 | 0 1 1 0 | 16 | 0 | 32 |
| 0 1 0 0 | 0 | 0 | 32 | 0 1 0 1 | 0 | 8 | 32 |
| 0 1 0 1 | 0 | 8 | 32 | 0 1 0 0 | 0 | 0 | 32 |
| 0 1 1 0 | 16 | 0 | 32 | 0 0 1 1 | 16 | 8 | 0 |
| 0 1 1 1 | 16 | 8 | 32 | 0 0 1 0 | 16 | 0 | 0 |
| 1 0 0 0 | 0 | 0 | 64 | 0 0 0 1 | 0 | 8 | 0 |
| 1 0 0 1 | 0 | 8 | 64 | 0 0 0 0 | 0 | 0 | 0 |

| BIT COUNT | RIGHT SHIFT SELECTION | | | CONVERTED LEFT COUNT | LEFT SHIFT SELECTION | | |
|---|---|---|---|---|---|---|---|
| $2^2 2^1 2^0$ | INITIAL | RANK 1 | RANK 2 | $2^2 2^1 2^0$ | INITIAL | RANK 1 | RANK 2 |
| 0 0 0 | 0 | 0 | 0 | 1 1 1 | L7 | 6 | 1 |
| 0 0 1 | 0 | 0 | 1 | 1 1 0 | L7 | 6 | 0 |
| 0 1 0 | 0 | 2 | 0 | 1 0 1 | L7 | 4 | 1 |
| 0 1 1 | 0 | 2 | 1 | 1 0 0 | L7 | 4 | 0 |
| 1 0 0 | 0 | 4 | 0 | 0 1 1 | L7 | 2 | 1 |
| 1 0 1 | 0 | 4 | 1 | 0 1 0 | L7 | 2 | 0 |
| 1 1 0 | 0 | 6 | 0 | 0 0 1 | L7 | 0 | 1 |
| 1 1 1 | 0 | 6 | 1 | 0 0 0 | L7 | 0 | 0 |

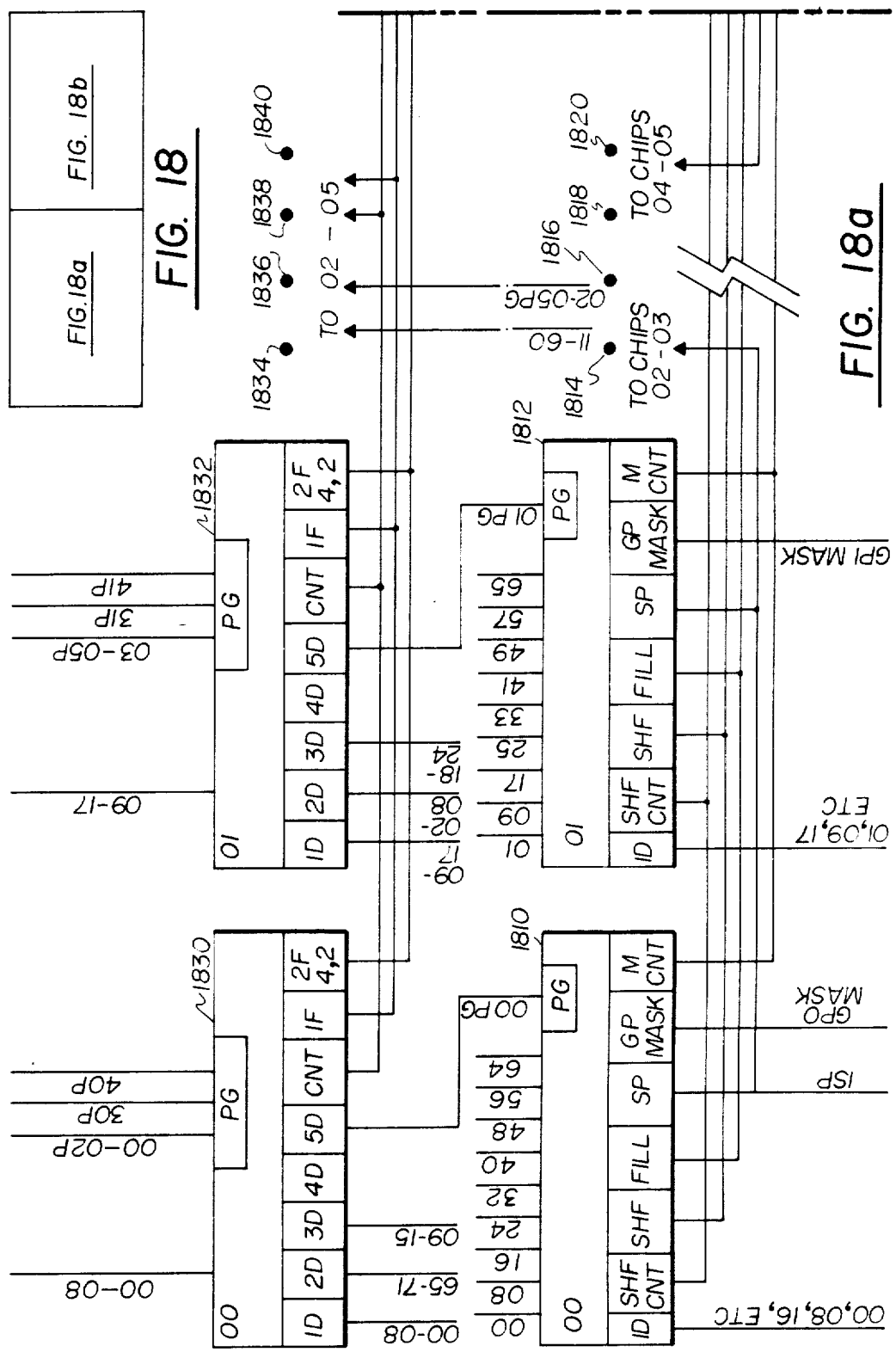

ERROR CHECKED HIGH SPEED SHIFT MATRIX

BACKGROUND OF THE INVENTION

A. Field of the Invention

This invention relates to those logical networks utilized in the arithmetic sections of present day data processing system known as shift matrices or barrel switches. These networks are used to accomplish high speed shifting of data in such a data processing system. More particularly it relates to a unique shift matrix design which not only simplifies shift count conversion but also includes a novel method of parity prediction for such a matrix utilizing a gated parity network.

B. Prior Art

As previously noted, the arithmetic sections of many contemporary computers utilize networks commonly referred to as shift matrices or barrel switches to accomplish rapid shifting of data. In most cases the matrix is composed of two or more ranks of multiplexers interconnected to perform the matrixing of any given bit position of a data item to any other bit position. Standard part families offer very few parts to assist in shift matrix implementation. The few parts that are available are cumbersome to control and it is difficult to implement the full generality of shifting modes required by contemporary computers.

Normally, earlier shift matrixes have been designed to shift in only one direction, either right or left, to conserve logic circuitry. Shifts in the opposite direction have usually been handled by converting the shift count to an equivalent shift in the designed direction. This has been accomplished in the past by subtracting the shift count from the design radix of the matrix. (i.e., for a 36-bit wide matrix the radix is 36, etc.). This, of course, adds timing overhead to the delay ordinarily associated with passage through the matrix.

Further, in many modern machines, increased emphasis is being placed on error detection in all data paths. The complexity of shift matrices makes this very difficult to achieve when all of the modes in which a matrix must function are considered. The simplest method, but most costly, has been to duplicate the entire matrix and compare the outputs. Parity checking, to date, has been just as costly because the networks required to predict final parity of the matrix output for the various modes, circular or open-ended shifts with zero or sign fill in either direction, usually exceeds the amount of logic circuitry required to implement the matrix.

BRIEF DESCRIPTION OF THE INVENTION OBJECTS

Accordingly, it is an object of the present invention to provide a shift matrix which simplifies bit conversion and provides a novel method of parity prediction.

It is another object of the present invention to provide a rapid shift network capable of shifting either right or left, either circularly or open ended with zero or sign fill, which shift network incorporates single bit error detection without duplication or result comparison.

It is also an object of the present invention to provide a shift matrix which utilizes a novel method for shift count conversion in a single direction shift matrix.

It is a further object of the present invention to provide a shift matrix which incorporates error checking using a novel method of parity prediction for such a matrix utilizing a gated parity network.

It is a still further object of the present invention to provide a 72-bit shift matrix design for use with large scale integrated (LSI) implementations.

It is a still further object of the present invention to provide a shift matrix which utilizes additional means to regenerate original source parity from the matrix outputs for use in thru checking.

It is still a further object of the present invention to provide a special single precision mode in a 72 bit shift matrix which allows sign fill on the right of the single precision word (36 bit word) when the 36 bit word is left shifted.

It is also an object of this invention to provide a 72 bit shift matrix which requires only a single nine-bit parity generator to check the correctness of the matrix output.

It is another object of this invention to provide a shift matrix suitable for LSI implementation in gate arrays wherein eight byte shifters and eight bit shifters are combined to produce shifts of 0–72 places in either direction, circularly or open ended with zero or sign fill.

Finally, it is an object of this invention to provide a 72-bit shift matrix design for LSI implementation which simplifies shift count conversion by combining eight byte shifters and eight bit shifters to produce shifts of 0–72 places in either direction, circularly or open ended with zero or sign fill and also includes a novel method of parity prediction for such a matrix which method regenerates original source parity from the matrix outputs for use in thru checking and requires only a single nine-bit parity generator to check the correctness of the matrix.

SUMMARY OF THE INVENTION

An improved error checked rapid shift matrix is disclosed which is suitable for LSI implementation in gate arrays. In the disclosed embodiment eight byte shifters and eight bit shifters are combined to produce shifts of 0–72 places in either direction circularly or open ended with zero or sign fill. Additional means are provided to regenerate original source parity from the matrix outputs for use in thru checking. Only one nine-bit parity generator is required to determine that the output of the matrix is correct.

BRIEF DESCRIPTION OF THE DRAWINGS

The foregoing objects and the above summary will be more readily understood when read in conjunction with the accompanying drawings in which:

FIG. 18a and FIG. 18b when arranged as in FIG. 18 is an overall system block diagram illustrating the preferred embodiment of the present 72-bit shift matrix with the interconnection of the previously illustrated gate arrays.

DETAILED DESCRIPTION OF THE INVENTION

Figure 1:
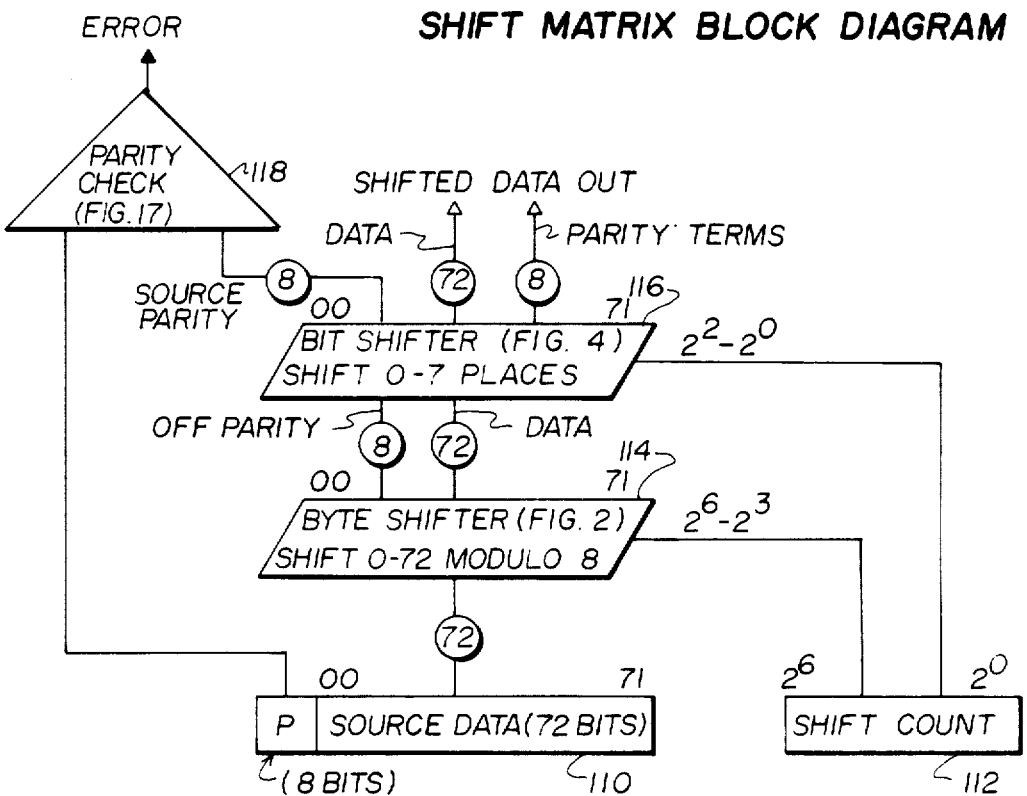
FIG. 1 illustrates a block diagram of the proposed error checked, high speed shift matrix in its preferred embodiment.

The following detailed description will be more readily comprehended when it is read in conjunction with the accompanying drawings in which like reference numerals symbolize corresponding parts.

In the consideration of the detail logic, as shown in the following figures, certain conventions will be followed. A logical 1 will be the equivalent of a High signal, and a logical 0 will be the equivalent of a Low signal. The logic symbols are conventional, and represent circuits that will accomplish the logical function represented. The triangular shaped symbol represents an emitter-follower, and are utilized for providing additional power drive without inversion of the input signals. The symbols having straight bottom and rounded top represents a logical AND function, and may show straight line input terminating at the input column or dot connected within the symbol. The straight line input or the dot connection represents a High AND, and results in a High output signal when all input signals are High. The open circles adjacent the input terminals indicate that the circuit responds to Low signals. Accordingly, two input lines terminating in open circles adjacent the input indicates a Low AND function whereby the output signal is Low only when both input signals are Low. The open circle at the output of the symbol indicates inversion of the resultant signal. For example, if a High AND function is satisfied, the straight line output will be a High signal and the signal at the circle will be Low. If the conditions are not satisfied, the reverse conditions will prevail. The symbols having curved input and the curved pointed output represent circuits that perform the logical OR function. The straight line input to the curved input portion of the symbol indicates that the circuit performs the OR function on High signals, resulting in a High output signal when any or all of the input signals are High. The open circle at the output portion of the symbol indicates the inverse of the condition that satisfies the logical function. For example, if the High OR circuit received a High input signal, the open circle output will provide a Low signal. When the OR symbol has open circle input lines, the logical function is that or providing the OR function of Low signals, and operation is similar to that just described. Other specific types of symbols will be described as they are referenced in the drawings.

Referring first to FIG. 1, there is shown in block diagram form, the relationship of the byte and bit shifters in the matrix design. Generally, the matrix design is divided into two ranks referred to as the byte shifter 114 and the bit shifter 116. The byte shifter rank 114 produces shifts of 0–72 places to the right in 8-bit increments. Left shifting is accomplished by translation of the shift count to an equivalent right shift count. All of the modes of shifting are accomplished in this byte shifter 114 rank, such as circular or open ended with either zero fill or sign fill in the open ended cases. The bit shifter rank 116 shifts right 0–7 places circularly only, since all zero or sign filling is accomplished in the byte shift rank.

Seventy-two bits of source data and a plurality of eight parity bits P are stored in register 110. The seventy-two bits of source data are transferred to the byte shifter 114, where, under control of the shift count signals $2^3$-$2^6$ stored in register 112, they may be bidirectionally shifted in 8-bit segments. The eight parity bits P are sent directly to the parity check circuit 118. The byte shifter 114 provides both an 8-bit off parity signal and a 72-bit data signal to the bit shifter 116 where individual bit shifts are accomplished under the control of shift counts $2^2$-$2^0$ coming from shift counter 112. The term off-parity is herein defined as the parity of those bits which are discarded from one end or the other of a shift register circuit which results from either a right or a left shift in a scalar shift register circuit. These discarded bits dropping from one end or the other of the register as the result of the left or the right shift are replaced by fill bits entering the opposite end of the register.

The bit shifter 116 provides as output signals the 72-bits of data, the 8-bits of parity terms and the 8-bits of predicted source parity signal. This parity signal is sent to the parity check circuit 118 where it is compared with the eight original parity signals P from register 110, to provide an error signal output when such comparison indicates inequality.

The method of error detection is parity thru checking of the matrix. It can be observed that in a circular shift matrix, the overall parity of the output does not change from the input parity. For circular shifts, therefore, a comparison of initial source operand parity to result parity will detect any single bit error in the matrix. To accomplish thru checking for open-ended shifts, source parity must be modified by logically subtracting the parity of bits shifted off and logically adding bits filled on the shift. The result of this modification of source parity must equal result parity for the non-error condition. It is important to note that parity of bits shifted off is used to verify shift correctness. Since the byte shift rank 114 accomplishes the open-ended shift cases, it is at this rank that predicted parity is generated. The bit shifter 116, since it shifts circularly only, does not change parity as data is passed through. Parity change is detected in the byte shift rank 114 by means of a gated parity network 118 driven by a sliding mask generator which also drives a mask/merge network to accomplish the masking off of the unwanted bits on open-ended shifts and merging in of appropriate fill bits. Both the mask generator and the mask/merge network are shown in FIG. 2.

Figure 2:
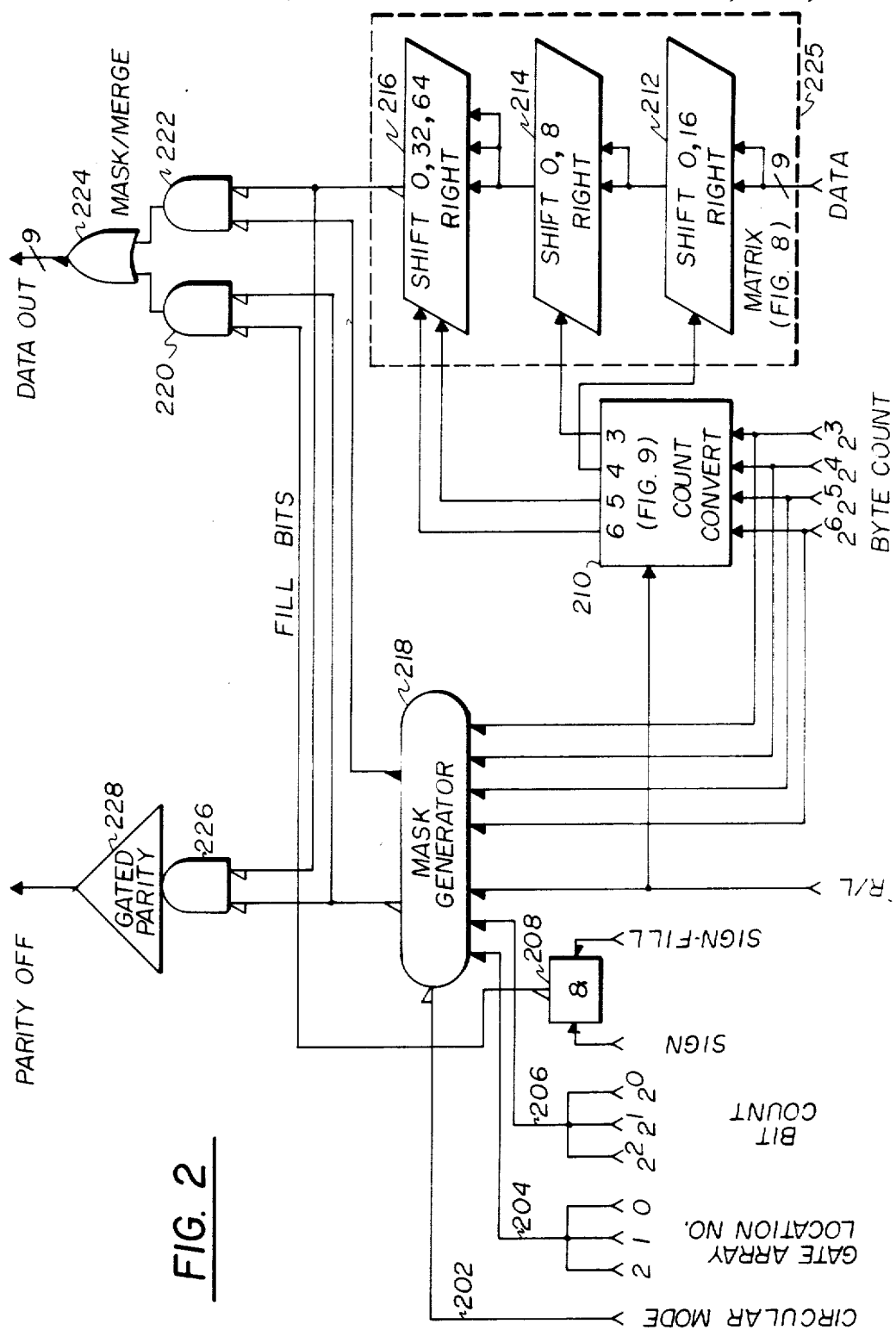
FIG. 2 shows a basic logic diagram of the byte shifter included in FIG. 1.

The structure of one of the basic byte shifters 114 is illustrated in FIG. 2. This byte shifter gate array implements every eighth bit of a 72-bit number to be shifted. Since this rank shifts in groups of 8, all interconnects between stages are accomplished internal to the chip, requiring no external chip interconnects. Each Gate Array (GA) as shown in FIG. 2, implements 9 stages of the byte shift rank and therefore requires eight GA's for a 72-bit wide matrix. Internally, shifting is to the right and divided into three shifting ranks 212, 214 and 216. The first rank 212 is controlled by the $2^4$ bit of the shift count producing a right shift of 0 or 16. The second rank 214 shifts right 0 or 8 places controlled by $2^3$ of the shift count and the third rank 216 produces right shifts of 0, 32 and 64 places from a decode of bits $2^5$ and $2^6$ of the shift count. FIG. 2 also illustrates the ranks and the relationship of the count bits to the rank selection. The count converter 210 provides the shift count signals $2^3$, $2^4$, $2^5$ and $2^6$ from the received byte counts of $2^3$, $2^4$, $2^5$ and $2^6$. A right/left (R/L) signal sent to the count converter 210 determines the direction of the shift.

The sign and sign fill signals are AND'ed together by AND gate 208 and the fill bits are sent to the mask/merge network comprised of gates 220, 222 and 224. The mask generator 218 also receives—in addition to the byte count signals $2^3$, $2^4$, $2^5$ and $2^6$, and the right/left shift signal—the bit count signals 206 ($2^0$, $2^1$ and $2^2$) and the group number mask (GP Mask) signals 204 ($2^0$, $2^1$, and $2^2$).

The byte shifter of FIG. 2 may be logically divided into five distinct sections. They are (1) The matrix proper enclosed in dashed block 25, which is comprised of three shift ranks 212, 214 and 216; (2) The counter converter 210; (3) The mask generator 218; (4) The mask/merge section which is comprised of AND gates 220, 222 and OR gate 224; and (5) The gated parity network section 228. The matrix proper is a conventional right circular matrix composed of the three ranks previously mentioned. These ranks are implemented with basic inverting multiplexers as shown in detail later in FIG. 8. Shift control of the ranks is accomplished in the shift count converter by the previously mentioned method and is shown in detail later in FIG. 9. The sliding mask generator is implemented as detailed later in FIG. 10. It generates a mask from the left corresponding to the mask count value. This mask is used to mask off unwanted bits for open-ended shifts. Left shifts invert the mask and therefore appear to be generated from the right. The table accompanying FIG. 10 details this mask generation. Primary mask generation is derived from the byte shift count, however, the bit count is also used to selectively mask the rightmost bit for right shifts or the leftmost bit for left shifts to achieve the complete masking operation for the entire matrix in the byte shifter. Each gate array is characterized by a GP Mask numbering convention wired into special input pins and compared to the bit shift count to determine if the appropriate end bit must be stripped off. The output of the matrix 225 is AND'ed via gate 222, with the output of the mask generator 218 to accomplish the stripping of unwanted bits and the fill condition is further AND'ed via gate 220, with the complement of the mask 218 and OR'ed 224 with the data to produce the mask/merge section of the design shown in detail in FIG. 13. Both the mask generator 218 and the matrix 225 also feed the gated parity net 228 shown in detail in FIG. 14 to produce the parity of bits shifted off on open-ended shifts. Also included in this parity network is the parity of the fill bits.

Figure 3:
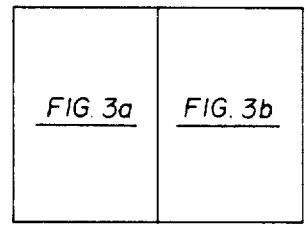
FIG. 3a and FIG. 3b, when arranged as in FIG. 3 presents a more detailed logic diagram of the byte shifter shown in FIG. 2.
Figure 3A:
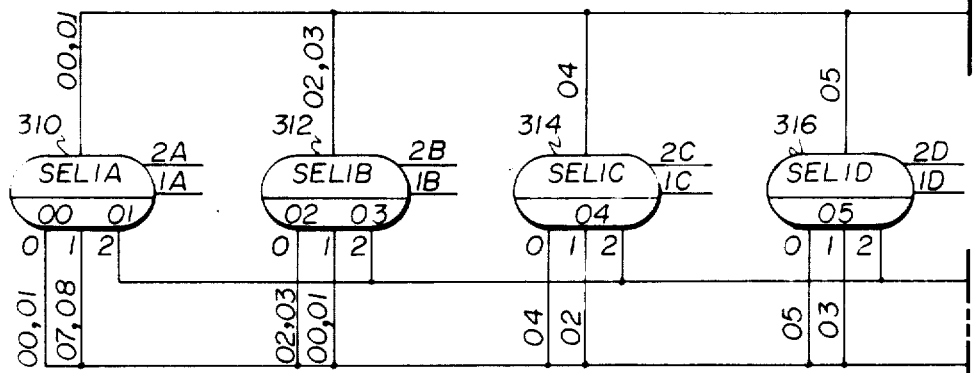
Figure 3B:
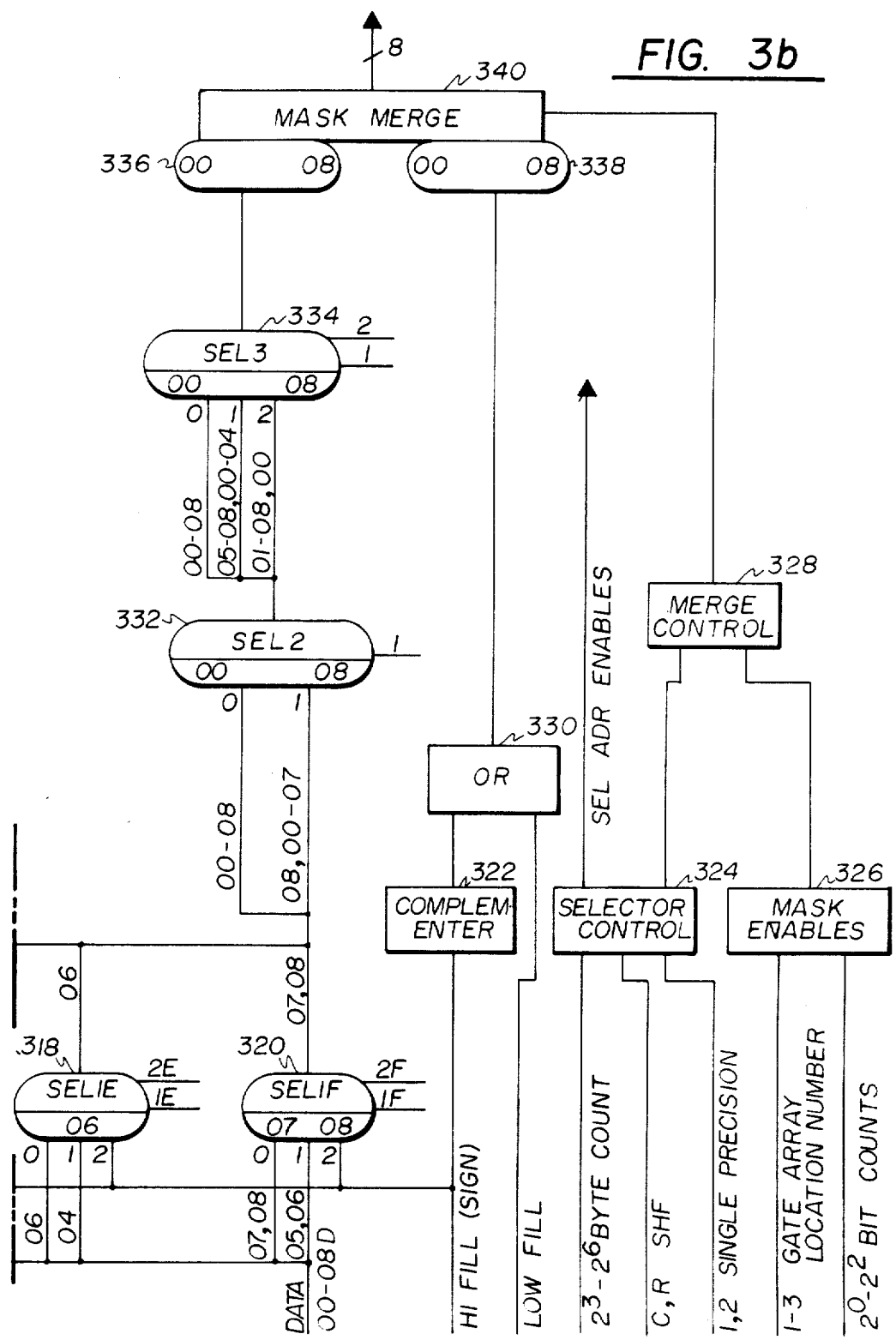

FIG. 3a and FIG. 3b when arranged as in is a more detailed block diagram of the byte shifter. The first rank of the matrix 225 includes the six selector circuits 310, 312, 314, 316, 318 and 320, the second rank of the matrix 225 is the selector circuit 332 and the third rank is selector circuit 334. The output of the third rank selector circuit 334 is gated via 336 to the mask/merge network 340. Thus, the byte shifter gate array has six selector control fields, 310, 312, 314, 316, 318 and 320 that determine its functional operation. The SHF, FILL, SP functions and the SHF COUNT, (Byte Count) control the data and sign/zero fill on a byte boundary. The GP mask and M COUNT (Bit count) control the sign/zero fill on a bit within a byte boundary. Truth Tables A, B, and C (shown below) show the functional operations controlled by the SHF COUNT, SHF function, FILL function and the SP (Single Precision) function. Truth Table D (also shown below) shows the functional operation controlled by the GP Mask and M COUNT.

Truth Table A shows double precision (72-bit) mode of operation. Notice that the single precision lines SP2 and SP1 are inactive (LOW). FILL F lines LO and HI determine the type of fill when the SHF line C (circular) is inactive.

Truth Tables B and C shows single precision (36-bit) mode of operation. The SP1 or SP2 lines are enabled in this mode but are mutually exclusive external to the array. The Sn terms shown in the table, e.g., S5 through S9, refer to the selection of either high fill or D5 through D9 input data. In the single precision mode the D5 through D9 or D6 through D9 inputs would normally be low, which would result in low fill if FILL HI is inactive or high fill if FILL HI is active. Notice that the Sn fill occurs even though the SHF C (circular) line is active.

A low active even parity of the fill bits+discarded bits is provided for parity prediction. This does not include the fill on the right when the SP Enables are active. The overall predicted parity of the shift matrix will still be correct because an even number of bits of all "1"s or all "0"s are involved when the SP functions are enabled.

Truth Table D shows the sign/zero fill operation that occurs due to the GP MASK and M COUNT control lines. This table is used in conjunction with Truth Tables A, B and C. The M COUNT corresponds to the bit within a byte shift count. GP Mask bit 4 is unconditionally tied high on odd array assignments, whereas Mask bits 1-3 are activated by the right shift enable. Arrays 00, 01 require a high active right shift enable on Mask bit 1 whereas arrays 06, 07 require a low active. Arrays 01, 03 require a high active right shift enable on Mask bit 2 and a low active on Mask bit 3, whereas arrays 04, 05 require a low active on Mask bit 2 and a high active on Mask bit 3.

TRUTH TABLE A

Double Precision (72-Bit) Mode

| SHF CNT | | | | SHF F | | FILL F | | SP F | | OUTPUT DTA | | | | | | | | |
|---|---|---|---|---|---|---|---|---|---|---|---|---|---|---|---|---|---|---|
| 8 | 4 | 2 | 1 | C | R | LO | HI | 2 | 1 | A | B | C | D | E | F | G | H | J |
| L | L | L | L | X | X | X | X | L | L | D1 | D2 | D3 | D4 | D5 | D6 | D7 | D8 | D9 |
| L | L | L | H | H | H | ↑ | | ↑ | | D9 | D1 | D2 | D3 | D4 | D5 | D6 | D7 | D8 |
| L | L | H | L | ↑ | | | | ↑ | | D8 | D9 | D1 | D2 | D3 | D4 | D5 | D6 | D7 |
| L | L | H | H | ↑ | | | | ↑ | | D7 | D8 | D9 | D1 | D2 | D3 | D4 | D5 | D6 |
| L | H | L | L | ↑ | | | | ↑ | | D6 | D7 | D8 | D9 | D1 | D2 | D3 | D4 | D5 |
| L | H | L | H | ↓ | | | | ↑ | | D5 | D6 | D7 | D8 | D9 | D1 | D2 | D3 | D4 |
| L | H | H | L | ↓ | | | | ↑ | | D4 | D5 | D6 | D7 | D8 | D9 | D1 | D2 | D3 |
| L | H | H | H | ↓ | | | | ↑ | | D3 | D4 | D5 | D6 | D7 | D8 | D9 | D1 | D2 |
| H | L | L | L | H | H | | | ↑ | | D2 | D3 | D4 | D5 | D6 | D7 | D8 | D9 | D1 |
| H | L | L | H | H | X | | | ↓ | | D1 | D2 | D3 | D4 | D5 | D6 | D7 | D8 | D9 |
| L | L | L | H | H | L | | | ↓ | | D2 | D3 | D4 | D5 | D6 | D7 | D8 | D9 | D1 |
| L | L | H | L | ↑ | | | | ↓ | | D3 | D4 | D5 | D6 | D7 | D8 | D9 | D1 | D2 |
| L | L | H | H | ↑ | | | | ↓ | | D4 | D5 | D6 | D7 | D8 | D9 | D1 | D2 | D3 |
| L | H | L | L | ↑ | | | | ↓ | | D5 | D6 | D7 | D8 | D9 | D1 | D2 | D3 | D4 |
| L | H | L | H | ↓ | | | | ↓ | | D6 | D7 | D8 | D9 | D1 | D2 | D3 | D4 | D5 |
| L | H | H | L | ↓ | | | | ↓ | | D7 | D8 | D9 | D1 | D2 | D3 | D4 | D5 | D6 |
| L | H | H | H | ↓ | | | | ↓ | | D8 | D9 | D1 | D2 | D3 | D4 | D5 | D6 | D7 |
| H | L | L | L | H | L | X | X | ↓ | | D9 | D1 | D2 | D3 | D4 | D5 | D6 | D7 | D8 |
| L | L | L | H | L | H | ↑ | * | ↓ | | F | D1 | D2 | D3 | D4 | D5 | D6 | D7 | D8 |
| L | L | H | L | ↑ | | | | ↓ | | F | F | D1 | D2 | D3 | D4 | D5 | D6 | D7 |
| L | L | H | H | ↑ | | ↑ | | ↓ | | F | F | F | D1 | D2 | D3 | D4 | D5 | D6 |
| L | H | L | L | ↑ | | ↑ | | ↓ | | F | F | F | F | D1 | D2 | D3 | D4 | D5 |
| L | H | L | H | ↓ | | ↑ | | ↓ | | F | F | F | F | F | D1 | D2 | D3 | D4 |
| L | H | H | L | ↓ | | ↑ | | ↓ | | F | F | F | F | F | F | D1 | D2 | D3 |
| L | H | H | H | ↓ | | ↑ | | ↓ | | F | F | F | F | F | F | F | D1 | D2 |
| H | L | L | L | L | H | ↑ | | L | L | F | F | F | F | F | F | F | F | D1 |
| H | L | L | H | L | X | ↑ | | X | X | F | F | F | F | F | F | F | F | F |
| L | L | L | H | L | L | ↓ | | L | L | D2 | D3 | D4 | D5 | D6 | D7 | D8 | D9 | F |
| L | L | H | L | ↑ | | ↓ | | ↑ | | D3 | D4 | D5 | D6 | D7 | D8 | D9 | F | F |
| L | L | H | H | ↑ | | ↓ | | ↑ | | D4 | D5 | D6 | D7 | D8 | D9 | F | F | F |
| L | H | L | L | ↑ | | ↓ | | ↑ | | D5 | D6 | D7 | D8 | D9 | F | F | F | F |
| L | H | L | H | ↑ | | ↓ | | ↑ | | D6 | D7 | D8 | D9 | F | F | F | F | F |
| L | H | H | L | ↓ | | ↓ | | ↑ | | D7 | D8 | D9 | F | F | F | F | F | F |
| L | H | H | H | ↓ | | ↓ | | ↑ | | D8 | D9 | F | F | F | F | F | F | F |
| H | L | L | L | L | L | * | | L | L | D9 | F | F | F | F | F | F | F | F |

*FILL F  OUTPUT DATA "F" IS THE FILL DETERMINED BY FILL F.
LO HI
L L = LOW FILL
L H = HIGH FILL
H X = LOW FILL

TRUTH TABLE B

Single Precision (36-Bit) Mode

| SHF CNT | | | | SHF F | | FILL F | | SP F | | OUTPUT DATA | | | | | | | | |
|---|---|---|---|---|---|---|---|---|---|---|---|---|---|---|---|---|---|---|
| 8 | 4 | 2 | 1 | C | R | LO | HI | 2 | 1 | A | B | C | D | E | F | G | H | J |
| L | L | L | L | X | X | * | | H | X | D1 | D2 | D3 | D4 | S5 | S6 | S7 | S8 | S9 |
| L | L | L | H | H | H | ↑ | | ↑ | | S1 | D1 | D2 | D3 | D4 | S5 | S6 | S7 | S8 |
| L | L | H | L | ↑ | | ↑ | | ↑ | | S8 | S9 | D1 | D2 | D3 | D4 | S5 | S6 | S7 |
| L | L | H | H | ↑ | | ↑ | | ↑ | | S7 | S8 | S9 | D1 | D2 | D3 | D4 | S5 | S6 |
| L | H | L | L | ↑ | | ↑ | | ↑ | | S6 | S7 | S8 | S9 | D1 | D2 | D3 | D4 | S5 |
| L | H | L | H | ↓ | | ↑ | | ↑ | | S5 | S6 | S7 | S8 | S9 | D1 | D2 | D3 | D4 |
| L | H | H | L | ↓ | | ↑ | | ↑ | | D4 | S5 | S6 | S7 | S8 | S9 | D1 | D2 | D3 |
| L | H | H | H | ↓ | | ↑ | | ↑ | | D3 | D4 | S5 | S6 | S7 | S8 | S9 | D1 | D2 |
| H | L | L | L | H | H | ↑ | | ↑ | | D2 | D3 | D4 | S5 | S6 | S7 | S8 | S9 | D1 |
| H | L | L | H | H | X | ↑ | | ↓ | | D1 | D2 | D3 | D4 | S5 | S6 | S7 | S8 | S9 |
| L | L | L | H | H | L | ↑ | | ↓ | | D2 | D3 | D4 | S5 | S6 | S7 | S8 | S9 | D1 |
| L | L | H | L | ↑ | | ↑ | | ↓ | | D3 | D4 | S5 | S6 | S7 | S8 | S9 | D1 | D2 |
| L | L | H | H | ↑ | | ↑ | | ↓ | | D4 | S5 | S6 | S7 | S8 | S9 | D1 | D2 | D3 |
| L | H | L | L | ↑ | | ↑ | | ↓ | | S5 | S6 | S7 | S8 | S9 | D1 | D2 | D3 | D4 |
| L | H | L | H | ↑ | | ↑ | | ↓ | | S6 | S7 | S8 | S9 | D1 | D2 | D3 | D4 | S5 |
| L | H | H | L | ↓ | | ↑ | | ↓ | | S7 | S8 | S9 | D1 | D2 | D3 | D4 | S5 | S6 |
| L | H | H | H | ↓ | | ↑ | | ↓ | | S8 | S9 | D1 | D2 | D3 | D4 | S5 | S6 | S7 |
| H | L | L | L | H | L | ↑ | H | | X | S9 | D1 | D2 | D3 | D4 | S5 | S6 | S7 | S8 |
| L | L | L | L | X | X | ↓ | L | | H | D1 | D2 | D3 | D4 | D5 | S6 | S7 | S8 | S9 |
| L | L | L | H | H | H | ↓ | | ↑ | | S9 | D1 | D2 | D3 | D4 | D5 | S6 | S7 | S8 |
| L | L | H | L | ↑ | | ↓ | | ↑ | | S8 | S9 | D1 | D2 | D3 | D4 | D5 | S6 | S7 |
| L | L | H | H | ↑ | | ↓ | | ↑ | | S7 | S8 | S9 | D1 | D2 | D3 | D4 | D5 | S6 |
| L | H | L | L | ↑ | | ↓ | | ↑ | | S6 | S7 | S8 | S9 | D1 | D2 | D3 | D4 | D5 |
| L | H | L | H | ↓ | | ↓ | | ↑ | | D5 | S6 | S7 | S8 | S9 | D1 | D2 | D3 | D4 |
| L | H | H | L | ↓ | | ↓ | | ↑ | | D4 | D5 | S6 | S7 | S8 | S9 | D1 | D2 | D3 |
| L | H | H | H | ↓ | | ↓ | | ↑ | | D3 | D4 | D5 | S6 | S7 | S8 | S9 | D1 | D2 |
| H | L | L | L | H | H | ↓ | | ↑ | | D2 | D3 | D4 | D5 | S6 | S7 | S8 | S9 | D1 |
| H | L | L | H | H | X | ↓ | | ↓ | | D1 | D2 | D3 | D4 | D5 | S6 | S7 | S8 | S9 |
| L | L | L | H | H | L | ↓ | | ↓ | | D2 | D3 | D4 | D5 | S6 | S7 | S8 | S9 | D5 |
| | | | H | L | | ↑ | | ↓ | | D3 | D4 | D5 | S6 | S7 | S8 | S9 | D1 | D2 |

TRUTH TABLE B-continued

| SHF CNT | | | | SHF F | | FILL F | | SP F | | Single Precision (36-Bit) Mode OUTPUT DATA | | | | | | | |
|---|---|---|---|---|---|---|---|---|---|---|---|---|---|---|---|---|---|
| 8 | 4 | 2 | 1 | C | R | LO | HI | 2 | 1 | A | B | C | D | E | F | G | H | J |
| L | L | H | H | | ↑ | | ↓ | | ↓ | D4 | D5 | S6 | S7 | S8 | S9 | D1 | D2 | D3 |
| | H | L | L | | ↑ | | ↓ | | ↓ | D5 | S6 | S7 | S8 | S9 | D1 | D2 | D3 | D4 |
| | H | L | H | | ↓ | | ↓ | | ↓ | S6 | S7 | S8 | S9 | D1 | D2 | D3 | D4 | D5 |
| | H | H | L | | ↓ | | ↓ | | ↓ | S7 | S8 | S9 | D1 | D2 | D3 | D4 | D5 | S6 |
| | H | H | H | | ↓ | | ↓ | | ↓ | S8 | S9 | D1 | D2 | D3 | D4 | D5 | S6 | S7 |
| H | L | L | L | H | | L | *  | L | H | S9 | D1 | D1 | D3 | D4 | D5 | S6 | S7 | S8 |

*FILL F
LO  HI        Sn
X   L    = (Sn = Dn)
X   H    = (Sn = H)

TRUTH TABLE C

| SHF CNT | | | | SHF F | | FILL F | | SP F | | Single Precision (36-Bit) Mode OUTPUT DATA | | | | | | | |
|---|---|---|---|---|---|---|---|---|---|---|---|---|---|---|---|---|---|
| 8 | 4 | 2 | 1 | C | R | LO | HI | 2 | 1 | A | B | C | D | E | F | G | H | J |
| L | L | L | H | L | H | * | | H | X | F | D1 | D2 | D3 | D4 | S5 | S6 | S7 | S8 |
| L | L | H | L | | ↑ | | ↑ | | ↑ | F | F | D1 | D2 | D3 | D4 | S5 | S6 | S7 |
| L | L | H | H | | ↑ | | ↑ | | ↑ | F | F | F | D1 | D2 | D3 | D4 | S5 | S6 |
| L | H | L | L | | ↑ | | ↑ | | ↑ | F | F | F | F | D1 | D2 | D3 | D4 | S5 |
| L | H | L | H | | ↓ | | ↑ | | ↑ | F | F | F | F | F | D1 | D2 | D3 | D4 |
| L | H | H | L | | ↓ | | ↑ | | ↑ | F | F | F | F | F | F | D1 | D2 | D3 |
| L | H | H | H | | ↓ | | ↑ | | ↑ | F | F | F | F | F | F | F | D1 | D2 |
| H | L | L | L | L | H | | ↑ | | ↑ | F | F | F | F | F | F | F | F | D1 |
| L | L | L | H | L | L | | ↑ | | ↓ | D2 | D3 | D4 | S5 | S6 | S7 | S8 | S9 | F |
| L | L | H | L | | ↑ | | ↑ | | ↓ | D3 | D4 | S5 | S6 | S7 | S8 | S9 | F | F |
| L | L | H | H | | ↑ | | ↑ | | ↓ | D4 | S5 | S6 | S7 | S8 | S9 | F | F | F |
| L | H | L | L | | ↑ | | ↑ | | ↓ | S5 | S6 | S7 | S8 | S9 | F | F | F | F |
| L | H | L | H | | ↓ | | ↑ | | ↓ | S6 | S7 | S8 | S9 | F | F | F | F | F |
| L | H | H | L | | ↓ | | ↑ | | ↓ | S7 | S8 | S9 | F | F | F | F | F | F |
| L | H | H | H | | ↓ | | ↓ | | ↓ | S8 | S9 | F | F | F | F | F | F | F |
| H | L | L | L | L | L | | | H | X | S9 | F | F | F | F | F | F | F | F |
| L | L | L | H | L | H | | ↑ | L | H | F | D1 | D2 | D3 | D4 | D5 | S6 | S7 | S8 |
| L | L | H | L | | ↑ | | ↓ | | ↑ | F | F | D1 | D2 | D3 | D4 | D5 | S6 | S7 |
| L | L | H | H | | ↑ | | ↓ | | ↑ | F | F | F | D1 | D2 | D3 | D4 | D5 | D6 |
| L | H | L | L | | ↑ | | ↓ | | ↑ | F | F | F | F | D1 | D2 | D3 | D4 | D5 |
| L | H | L | H | | ↓ | | ↓ | | ↑ | F | F | F | F | F | D1 | D2 | D3 | D4 |
| L | H | H | L | | ↓ | | ↓ | | ↑ | F | F | F | F | F | F | D1 | D2 | D3 |
| L | H | H | H | | ↓ | | ↓ | | ↑ | F | F | F | F | F | F | F | D1 | D2 |
| H | L | L | L | L | H | | ↓ | | ↑ | F | F | F | F | F | F | F | F | D1 |
| L | L | L | H | L | L | | ↓ | | ↓ | D2 | D3 | D4 | D5 | S6 | S7 | S8 | S9 | F |
| L | L | H | L | | ↑ | | ↓ | | ↓ | D3 | D4 | D5 | S6 | S7 | S8 | S9 | F | F |
| L | L | H | H | | ↑ | | ↓ | | ↓ | D4 | D5 | S6 | S7 | S8 | S9 | F | F | F |
| L | H | L | L | | ↑ | | ↓ | | ↓ | D5 | S6 | S7 | S8 | S9 | F | F | F | F |
| L | H | L | H | | ↓ | | ↓ | | ↓ | S6 | S7 | S8 | S9 | F | F | F | F | F |
| L | H | H | L | | ↓ | | ↓ | | ↓ | S7 | S8 | S9 | F | F | F | F | F | F |
| L | H | H | H | | ↓ | | ↓ | | ↓ | S8 | S9 | F | F | F | F | F | F | F |
| H | L | L | L | L | L | * | | L | H | S9 | F | F | F | F | F | F | F | F |

*SAME AS TABLE B

TRUTH TABLE D

| SHF F | | FILL F | GP MASK | | | M CNT | | | OUTPUT DATA | | | | | | | | CHIP ASSIGNMENT |
|---|---|---|---|---|---|---|---|---|---|---|---|---|---|---|---|---|---|
| C | R | * | 4 | 2 | 1 | 4 | 2 | 1 | A | B | C | D | E | F | G | H | J | |
| L | H | ↑ | H | H | L | X | X | X | D | D | D | D | D | D | D | D | D | 00 |
| L | L | ↑ | L | L | L | H | X | X | F | D | —————————— | | | | | | D | 00 |
| L | L | ↑ | L | L | L | X | H | X | F | D | —————————— | | | | | | D | 00 |
| L | L | ↑ | L | L | L | X | X | H | F | D | —————————— | | | | | | D | 00 |
| L | H | ↑ | H | H | H | H | H | H | D | —————————— | | | | | | D | F | 01 |
| L | L | ↑ | L | L | H | H | X | X | F | D | —————————— | | | | | | D | | 01 |
| L | L | ↑ | L | L | H | X | H | X | F | D | —————————— | | | | | | D | | 01 |
| L | H | ↑ | H | L | L | H | H | X | D | —————————— | | | | | | D | F | 02 |
| L | L | ↑ | L | H | L | H | X | X | F | D | —————————— | | | | | | D | | 02 |
| L | L | ↑ | L | H | L | X | H | H | F | D | —————————— | | | | | | D | | 02 |
| L | H | ↑ | H | L | H | H | H | X | D | —————————— | | | | | | D | F | 03 |
| L | H | ↑ | H | L | H | H | X | H | D | —————————— | | | | | | D | F | 03 |
| L | L | ↑ | L | H | H | H | X | X | F | D | —————————— | | | | | | D | | 03 |
| L | H | ↓ | L | H | L | H | X | X | D | —————————— | | | | | | D | F | 04 |
| L | L | ↓ | H | L | L | H | H | X | F | D | —————————— | | | | | | D | | 04 |
| L | L | ↓ | H | L | L | H | X | H | F | D | —————————— | | | | | | D | | 04 |
| L | H | ↓ | L | H | H | H | X | X | D | —————————— | | | | | | D | F | 05 |
| L | H | ↓ | L | H | H | X | H | H | D | —————————— | | | | | | D | F | 05 |
| L | L | ↓ | H | L | H | H | H | X | F | D | —————————— | | | | | | D | | 05 |
| L | H | ↓ | L | L | L | H | X | X | D | —————————— | | | | | | D | F | 06 |

TRUTH TABLE D-continued

| SHF F | FILL F | GP MASK | M CNT | OUTPUT DATA | CHIP ASSIGNMENT |
|-------|--------|---------|-------|-------------|-----------------|
| L H | ↓ | L L L | X H X | D ─────────── D F | 06 |
| L L | ↓ | H H L | H H H | F D ─────────── D | 06 |
| L H | ↓ | L L H | H X X | D ─────────── D F | 07 |
| L H | ↓ | L L H | X H X | D ─────────── D F | 07 |
| L H | ↓ | L L H | X X H | D ─────────── D F | 07 |
| L L | * | H H H | X X X | D D D D D D D D | 07 |
| H X | X X | X X X | X X X | D D D D D D D D | ALL |

*FILL F
L L = LOW FILL OUTPUT DATA "D" IS THE SHIFTED INPUT DATA.
L H = HIGH FILL OUTPUT DATA "F" IS THE FILL DETERMINED BY FILL − F
H X = LOW FILL

Figure 4:
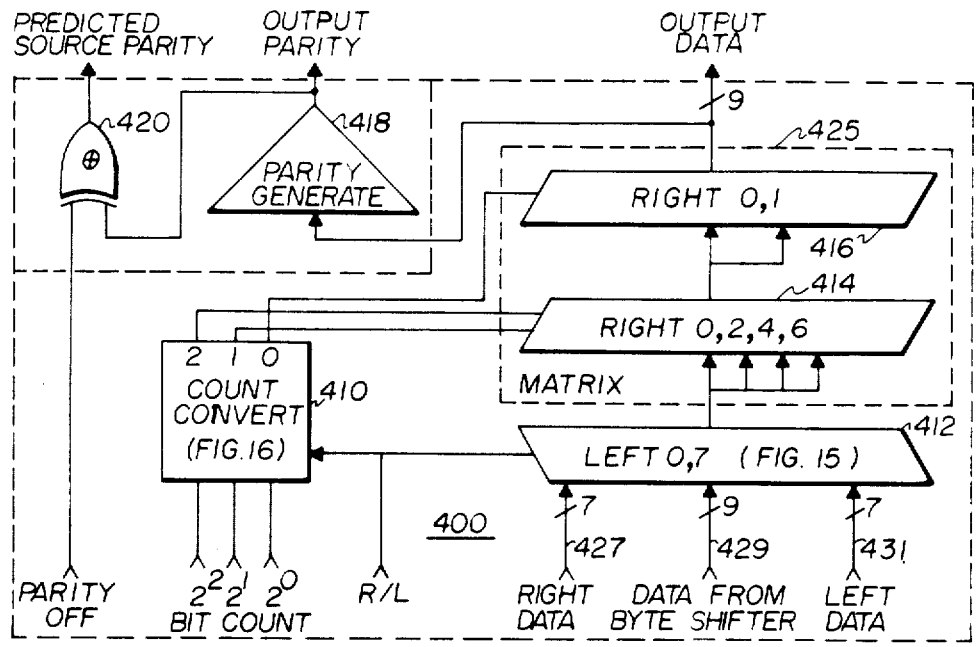
FIG. 4 presents a basic logic diagram of the bit shifter shown in FIG. 1.

The bit shift function is the second type of shifter 116 in the matrix of FIG. 1. It produces shifts of zero to seven places for nine stages of logic. Shifting is to the right and is accomplished in two ranks. The first shifting 0, 2, 4 and 6 places with the second rank shifting 0 or 1 places. An initial input rank is used to compensate for the selected method of left shift count conversion. FIG. 4 illustrates the basic structure of the bit shifter and the relationship of the shift count bits $2^2$-$2^0$ and the appropriate shift ranks.

Thus, the bit shifter (116 of FIG. 1) is shown in block diagram form in FIG. 4. It may be logically divided into four distinct sections. They are (1) The matrix proper 414, 416; (2) The left seven (7) corrector 412; (3) The count converter 410; and finally (4) The parity generator 418. The matrix proper 414, 416 is a conventional multiplexer configuration to produce right shifts of 0–7 places to the right. The left 7 corrector 412 is for left shifts and receives nine bits 429 from the byte shifter corresponding to the stages being represented in the bit shifter and additionally 7 adjacent bits 427 to the left for fill on right shift operations and 7 adjacent bits 431 to the right for fill on left shifts. This rank produces an initial left shift of 7 places when shifting left. The third section is the count converter 410. It converts the shift count for left shift operations by complementing the bit shift count. The final section, the parity generator 418 generates the parity of the matrix output on a nine-bit unit and also combines this parity term with the off parity from one of the byte shifters in gate 420. Combining all the predicted parity terms together predicts the initial source parity and is used for validating shift correctness.

Figure 5:
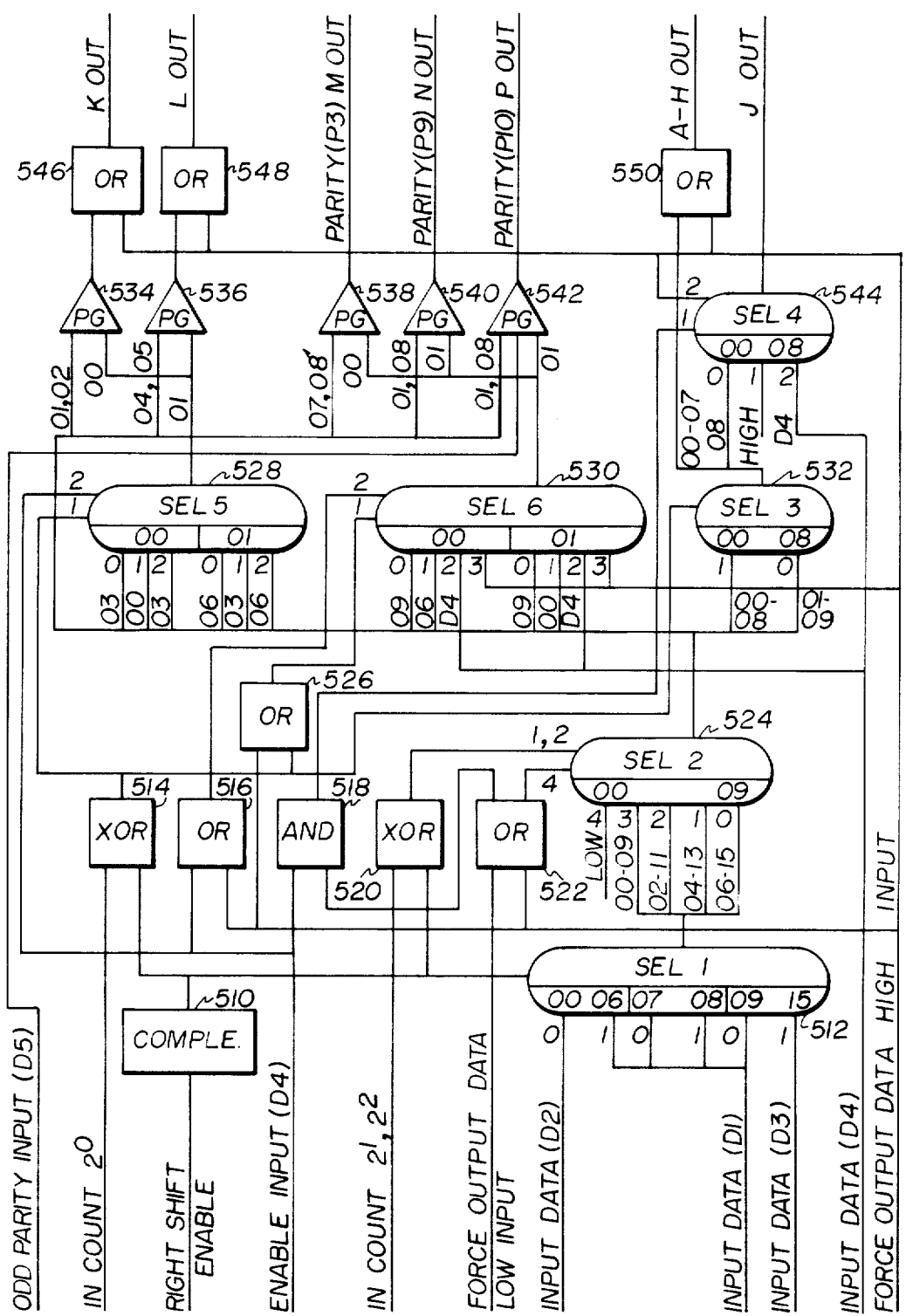
FIG. 5 is an illustration of a more detailed logic diagram of the bit shifter shown in FIG. 4.

FIG. 5 is a more detailed block diagram of the gate array design for the bit shifter 116 of FIG. 1. It illustrates a 9-bit circular shifter that shifts right or left 0–7 bit positions, and is designed to be used in conjunction with the byte shifter array FIG. 3 to form a 72-bit shift matrix. The sign/zero fill of the shift matrix is performed by the byte shifter, therefore, the two ranks cannot be interchanged if the "fill" is required in the shift matrix.

The bit shifter truth table (shown below) shows the functional operation of the array. Note that the 2F=1 function should not be used unless CNT=1 and 1F=0 (left shift). Values other than these could cause incorrect parity generation. This mode is used to insert the least significant bit of the partial quotient when using the shift matrix in a divide operation.

BIT SHIFTER TRUTH TABLE

| 2F | | IF | CNT | | | OUTPUT DATA | | | | | | | |
|----|---|----|----|---|---|---|---|---|---|---|---|---|---|
| 4 | 2 | 1 | 1 | 4 | 2 | 1 | A | B | C | D | E | F | G | H | J |
| L | L | L | X | L | L | L | 1D1 | 1D2 | 1D3 | 1D4 | 1D5 | 1D6 | 1D7 | 1D8 | 1D9 |
| | ↑ | | H | L | L | H | 2D7 | 1D1 | 1D2 | 1D3 | 1D4 | 1D5 | 1D6 | 1D7 | 1D8 |
| | ↑ | | H | L | H | L | 2D6 | 2D7 | 1D1 | 1D2 | 1D3 | 1D4 | 1D5 | 1D6 | 1D7 |
| | ↑ | | H | L | H | H | 2D5 | 2D6 | 2D7 | 1D1 | 1D2 | 1D3 | 1D4 | 1D5 | 1D6 |
| | ↑ | | H | H | L | L | 2D4 | 2D5 | 2D6 | 2D7 | 1D1 | 1D2 | 1D3 | 1D4 | 1D5 |
| | ↑ | | H | H | L | H | 2D3 | 2D4 | 2D5 | 2D6 | 2D7 | 1D1 | 1D2 | 1D3 | 1D4 |
| | ↑ | | H | H | H | L | 2D2 | 2D3 | 2D4 | 2D5 | 2D6 | 2D7 | 1D1 | 1D2 | 1D3 |
| | ↑ | | H | H | H | H | 2D1 | 2D2 | 2D3 | 2D4 | 2D5 | 2D6 | 2D7 | 1D1 | 1D2 |
| | ↓ | | L | L | L | H | 1D2 | 1D3 | 1D4 | 1D5 | 1D6 | 1D7 | 1D8 | 1D9 | 3D1 |
| | ↓ | | L | L | H | L | 1D3 | 1D4 | 1D5 | 1D6 | 1D7 | 1D8 | 1D9 | 3D1 | 3D2 |
| | ↓ | | L | L | H | H | 1D4 | 1D5 | 1D6 | 1D7 | 1D8 | 1D9 | 3D1 | 3D2 | 3D3 |
| | ↓ | | L | H | L | L | 1D5 | 1D6 | 1D7 | 1D8 | 1D9 | 3D1 | 3D2 | 3D3 | 3D4 |
| | ↓ | | L | H | L | H | 1D6 | 1D7 | 1D8 | 1D9 | 3D1 | 3D2 | 3D3 | 3D4 | 3D5 |
| | ↓ | | L | H | H | L | 1D7 | 1D8 | 1D9 | 3D1 | 3D2 | 3D3 | 3D4 | 3D5 | 3D6 |
| L | L | L | L | H | H | H | 1D8 | 1D9 | 3D1 | 3D2 | 3D3 | 3D4 | 3D5 | 3D6 | 3D7 |
| L | L | H | X | L | L | L | 1D1 | 1D2 | 1D3 | 1D4 | 1D5 | 1D6 | 1D7 | 1D8 | 4D1 |
| | ↑ | | H | L | L | H | 2D7 | 1D1 | 1D2 | 1D3 | 1D4 | 1D5 | 1D6 | 1D7 | 4D1 |
| | ↑ | | H | L | H | L | 2D6 | 2D7 | 1D1 | 1D2 | 1D3 | 1D4 | 1D5 | 1D6 | 4D1 |
| | ↑ | | H | L | H | H | 2D5 | 2D6 | 2D7 | 1D1 | 1D2 | 1D3 | 1D4 | 1D5 | 4D1 |
| | ↑ | | H | H | L | L | 2D4 | 2D5 | 2D6 | 2D7 | 1D1 | 1D2 | 1D3 | 1D4 | 4D1 |
| | ↑ | | H | H | L | H | 2D3 | 2D4 | 2D5 | 2D6 | 2D7 | 1D1 | 1D2 | 1D3 | 4D1 |
| | ↑ | | H | H | H | L | 2D2 | 2D3 | 2D4 | 2D5 | 2D6 | 2D7 | 1D1 | 1D2 | 4D1 |
| | ↑ | | H | H | H | H | 2D1 | 2D2 | 2D3 | 2D4 | 2D5 | 2D6 | 2D7 | 1D1 | 4D1 |
| | ↓ | | L | L | L | H | 1D2 | 1D3 | 1D4 | 1D5 | 1D6 | 1D7 | 1D8 | 1D9 | 4D1 |
| | ↓ | | L | L | H | L | 1D3 | 1D4 | 1D5 | 1D6 | 1D7 | 1D8 | 1D9 | 3D1 | 4D1 |
| | ↓ | | L | L | H | H | 1D4 | 1D5 | 1D6 | 1D7 | 1D8 | 1D9 | 3D1 | 3D2 | 4D1 |
| | ↓ | | L | H | L | L | 1D5 | 1D6 | 1D7 | 1D8 | 1D9 | 3D1 | 3D2 | 3D3 | 4D1 |
| | ↓ | | L | H | L | H | 1D6 | 1D7 | 1D8 | 1D9 | 3D1 | 3D2 | 3D3 | 3D4 | 4D1 |
| | ↓ | | L | H | H | L | 1D7 | 1D8 | 1D9 | 3D1 | 3D2 | 3D3 | 3D4 | 3D5 | 4D1 |
| L | L | H | L | H | H | H | 1D8 | 1D9 | 3D1 | 3D2 | 3D3 | 3D4 | 3D5 | 3D6 | 4D1 |
| L | H | X | X | X | X | X | L | L | L | L | L | L | L | L | L |

BIT SHIFTER TRUTH TABLE-continued

| 2F | IF | | CNT | | | OUTPUT DATA | | | | | | | | |
|---|---|---|---|---|---|---|---|---|---|---|---|---|---|---|
| 4 | 2 | 1 | 1 | 4 | 2 | 1 | A | B | C | D | E | F | G | H | J |
| H | X | X | X | X | X | X | H | H | H | H | H | H | H | H | H |

*2F = 1 SHOULD ONLY BE USED WHEN IF = 1 AND CNT = 1 OTHER VALUES COULD GENERATE INCORRECT PARITY

Figure 18B:
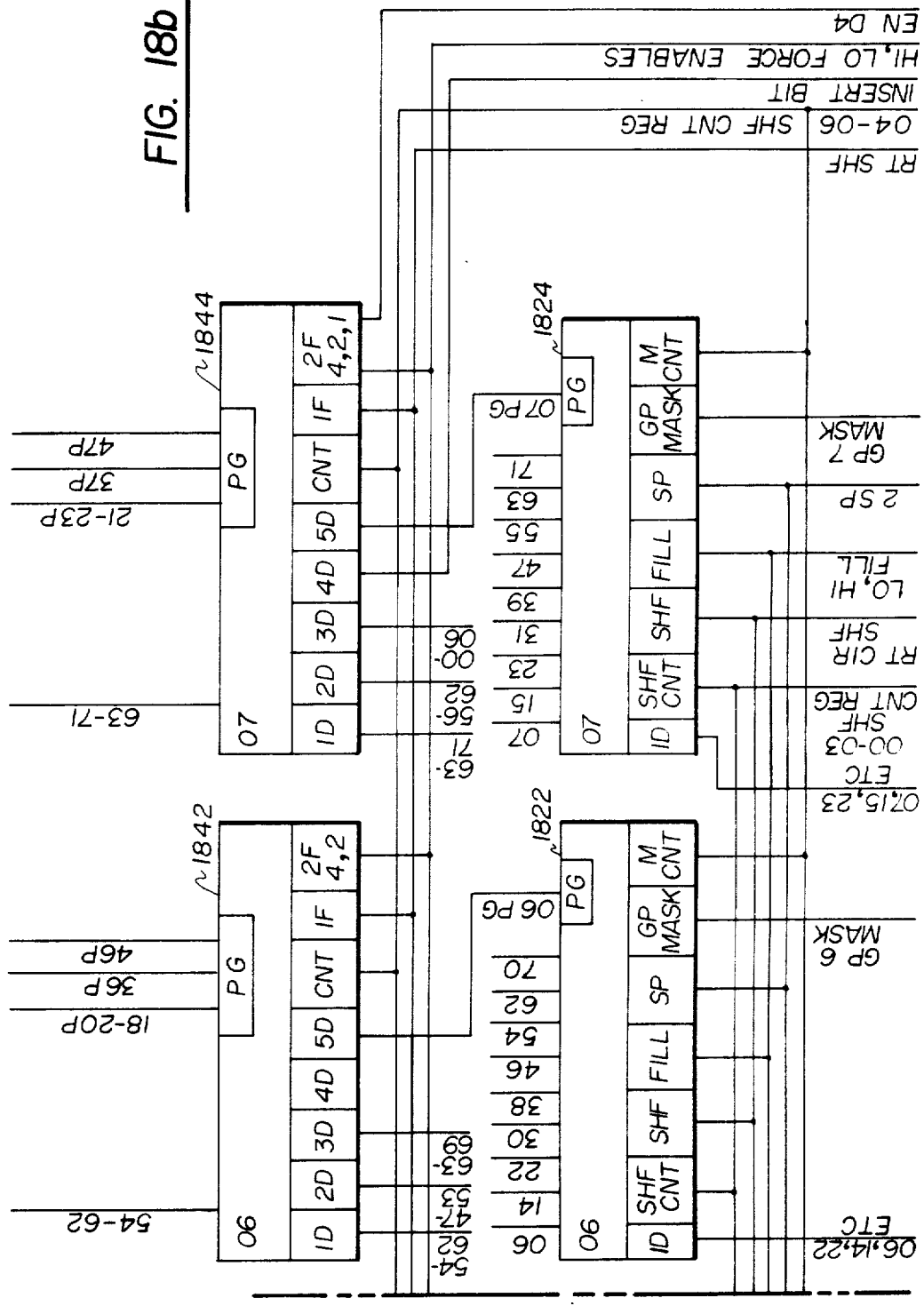

Jumping ahead for a moment to FIG. 18a and FIG. 18b, there is shown the interconnect of a 72-bit shift matrix comprising eight FIG. 13a and FIG. 13b byte shifters in the first rank and eight FIG. 5 bit shifters in the second rank. The sign/zero fill is performed in the first rank by the byte shifter. The parity of the fill bits + - with the discarded bits is generated by the byte shifter and is connected to the D5 input of the bit shifter. The overall parity of the 10-bit parity generators of the bit shifters and the overall parity of the 72-bit source data will be odd if a single bit or multiple odd error occurs in the shift matrix.

Returning to FIG. 5, the 9-bit bit shifter gate array is capable of circularly shifting right or left, zero to seven-bit positions by the binary value of the count inputs $2^0$, $2^1$, $2^2$ to exclusive OR gates 514, 520 respectively. The enable D4 input line to AND gate 518 unconditionally inserts D4 data on the right as long as the force high input is inactive to OR gates 516, 522, to selector 530 and to output OR gates 546, 548 and 550. Similarly, D4 data is inserted on the right as long as the force low input to OR gate 522 is inactive. When these force high and force low lines are active, the output data lines (A-H) from OR gate 550 and output J selector circuit 544 are caused to go high or low and correct parity is generated from parity generating circuits 534, 536 via OR gates 546 and 548 as K and L outputs.

Further, three-bit, nine-bit and ten-bit (nine-bit+D5) parities of the output data are provided from parity generating circuits 538, 540 and 542 respectively.

Figures 6, 17:
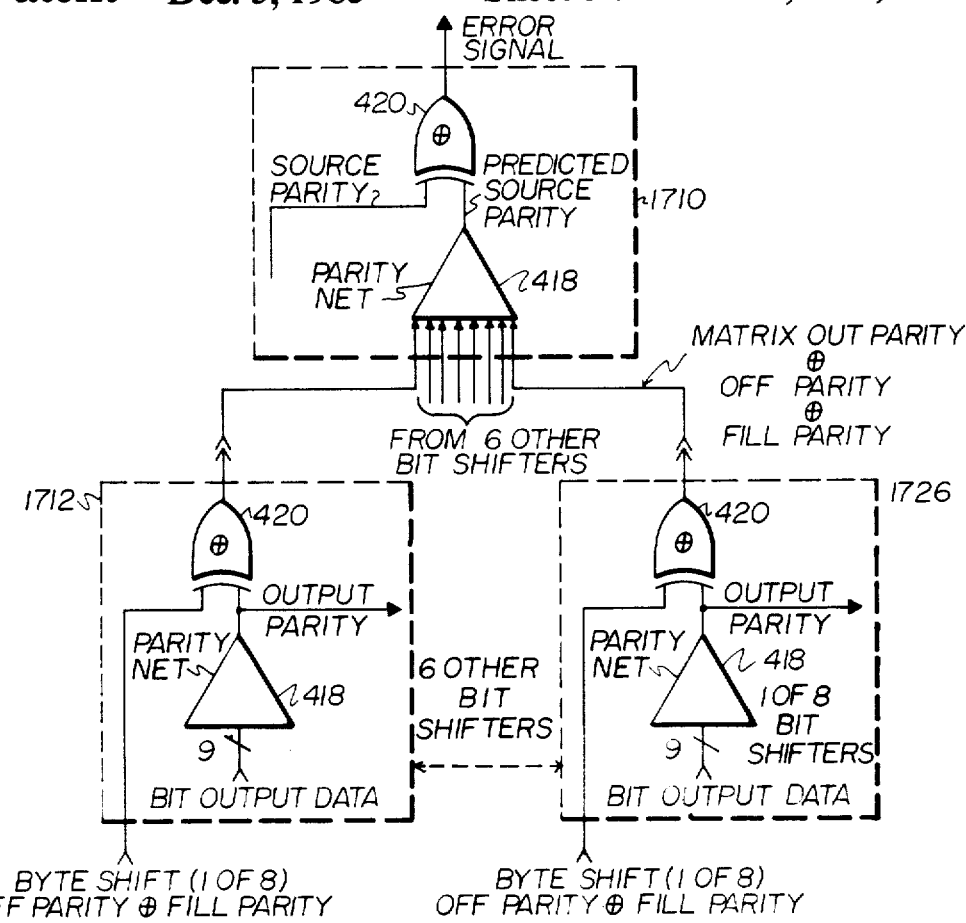
FIG. 6 is a table illustrating the byte shift count conversion.
FIG. 17 is a logical block diagram showing the parity predict and checking logic.

FIG. 6 is a table showing byte shift count conversion. As illustrated, it should first be noted that bit $2^4$ of the byte count is used "as is" since no change to this bit occurs between the bit $2^4$ of the byte count and bit $2^4$ of the converted left count. This fact is taken advantage of by using this bit to control the first rank of the byte shifter for shifts of 0 or 16 places. Count bit $2^3$ is always complemented when converting and controls the second rank of shift 0 or 8 places. Bits $2^6$ and $2^5$ are converted using the $2^4$ bit as a borrow input and controls the third rank.

Figures 7, 8:
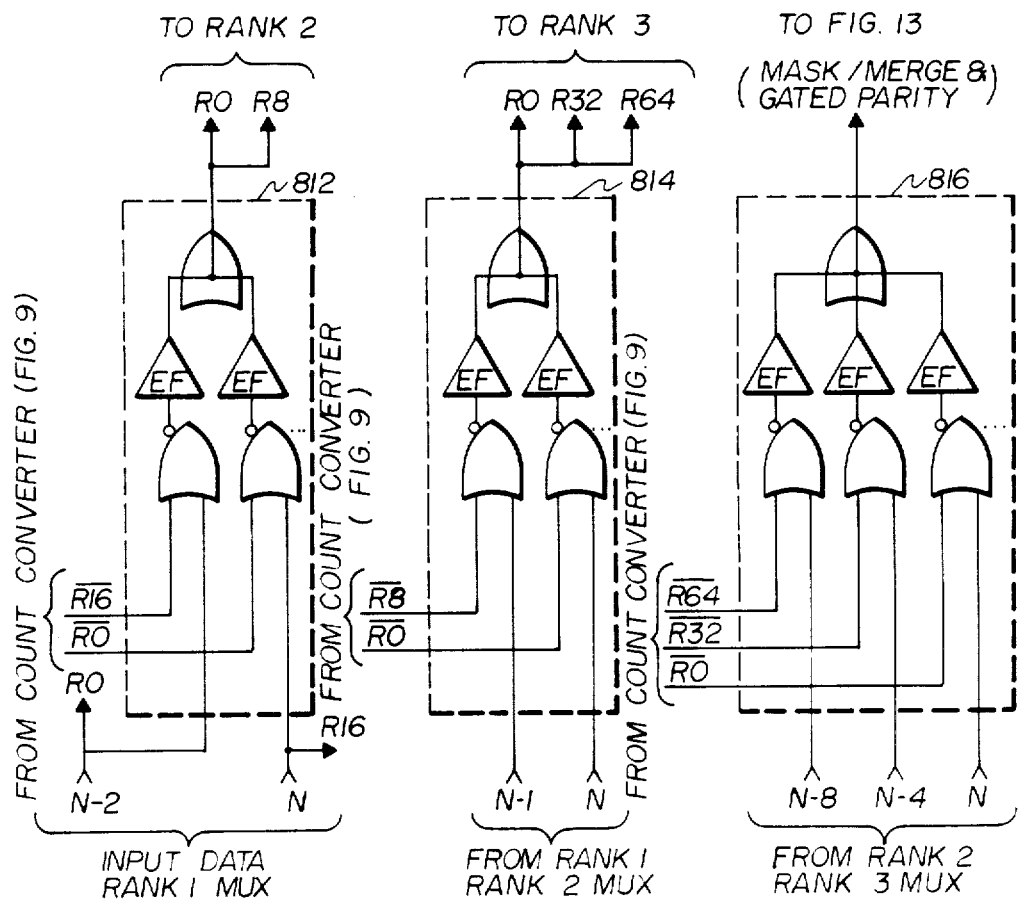
FIG. 7 is a table showing the bit shift count conversion.
FIG. 8 illustrates a group of typical multiplexers as utilized in the proposed shift matrix shown in FIG. 2.

Similarly, FIG. 7 is a table showing the bit shift count conversion. No bit of the bit count may be used "as is". Bits $2^2$, $2^1$ and $2^0$ are always complemented. Hence, for the bit shifter, an initial left shift of seven is produced and the result is shifted right by the ones complement of all of the bits of the bit shift count, i.e. bits $2^2$, $2^1$ and $2^0$.

Conversion of left shift counts to equivalent right shift counts is a variation of the previously mentioned method of subtracting the shift count from the radix of the matrix, 72 bits in this case. A special variation is implemented to minimize the delay associated with the subtraction process. In a system composed of a byte shift rank and a bit shift rank, the seven-bit shift count may be divided between the two ranks such that bits $2^6$-$2^3$ control the byte shifter and bits $2^2$-$2^0$ control the bit shifter. When converting counts, however, the value of the bit shift count must normally be considered when subtracting the count from the radix since a borrow generated by these bits must be propagated to the upper stages. This is undesirable when attempting to control the shift ranks of the matrix. A method which avoids this interaction is to subtract the byte shift count, bits $2^6$-$2^3$ from the upper 4 bits of the constant 72 and to form the bit shift count by generating the ones complement of bits $2^2$-$2^0$ and to introduce an initial left shift of seven to compensate. This compensation is the first rank of the bit shifter. FIGS. 6 and 7 detail this conversion. It should be noted that bit $2^4$ can be used "as is" since no change to this bit occurs. This fact is taken advantage of by using this bit to control the first rank of the byte shifter for shifts of 0 or 16 places. Count bit $2^3$ is always complemented when converting and controls the second rank of shift 0 or 8 places. Bits $2^6$, $2^5$ are converted using the $2^4$ bit as a borrow input and control the third rank. For the bit shifter, an initial left shift of seven is produced and the result is shifted right by the ones complement of the bit shift count, bits $2^2$-$2^0$.

Next, consider FIG. 8 which illustrates the three separate multiplexers used in the byte shifter matrix 225 of FIG. 2. From right to left, there is shown a rank 1 MUX 812, a rank 2 MUX 814, and a rank 3 MUX 814. The input data is received by the rank 1 multiplexer 812. The nine output signals R0-R8 of multiplexer 812 are sent to the input of rank 2 multiplexer 814. Similarly, the output signals from the multiplexer 814 are sent to the input to rank 3 multiplexer 816 to provide the output signal to the mask/merge, 340 of FIG. 3 and the gated parity network, 228 of FIG. 2. Thus, the three ranks of the conventional right circular matrix 225 of FIG. 2 are implemented with the basic inverting multiplexers as shown in the FIG. 8.

Figure 9:
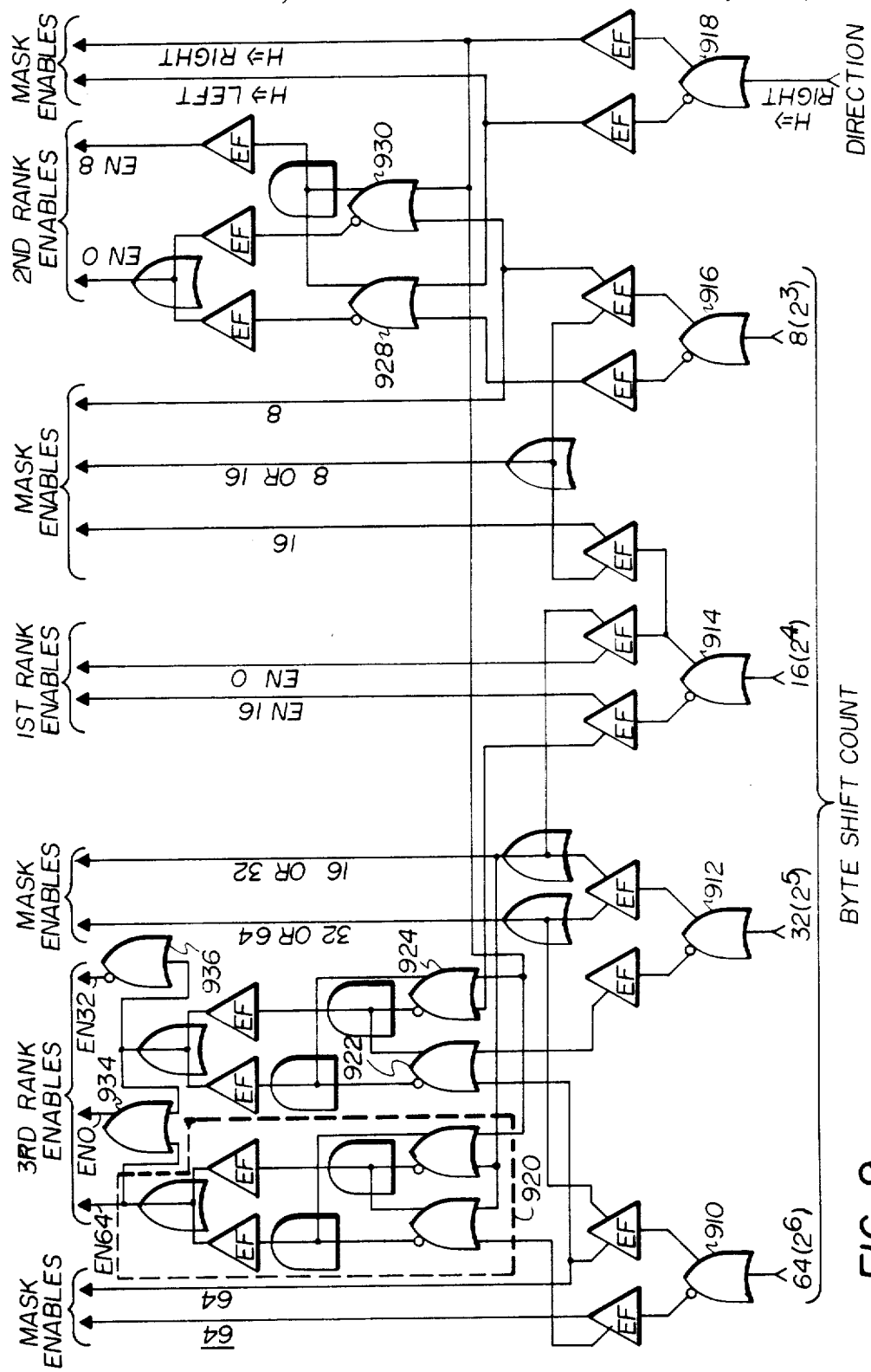
FIG. 9 is a logic diagram of the byte count converter of FIG. 2.

FIG. 9 illustrates, in detail, the byte count converter, generally shown as 210 in FIG. 2. It provides the shift control of the ranks mentioned above. Thus, upon receipt of the byte shift count bits $2^3$, $2^4$, $2^5$, and $2^6$ to AND gates 916, 914, 912 and 910 respectively the signals are passed through a level of emitter followers (EF). In the case of the mask enable signals 64 and 64, they are sent directly out from the emitter followers. However, third rank enable signal EN64 is passed through exclusive OR gate 920. Third rank enable signal EN32 is passed through a pair of OR gates 922, 924, a pair of AND gates, (shown as wired connections), a pair of emitter followers, another directly wired AND gate and finally through OR gate 936. Enable signal EN0 is created by OR'ing together, via OR gate 934, the remaining EN32 and EN64 signals of the third rank enable signals.

Similarly, the remaining first and second rank enable signals EN0, EN16 and EN0, EN8 are also created, either directly from the emitter follower circuits, or via AND gates 928, 930. Mask enable signals 32 or 64; 16 or 32; 16; 8 or 16; and 8 are likewise created. A separate OR gate 918 receives the direction input signal H→right to provide the right and left mask enable signals.

Figure 10:
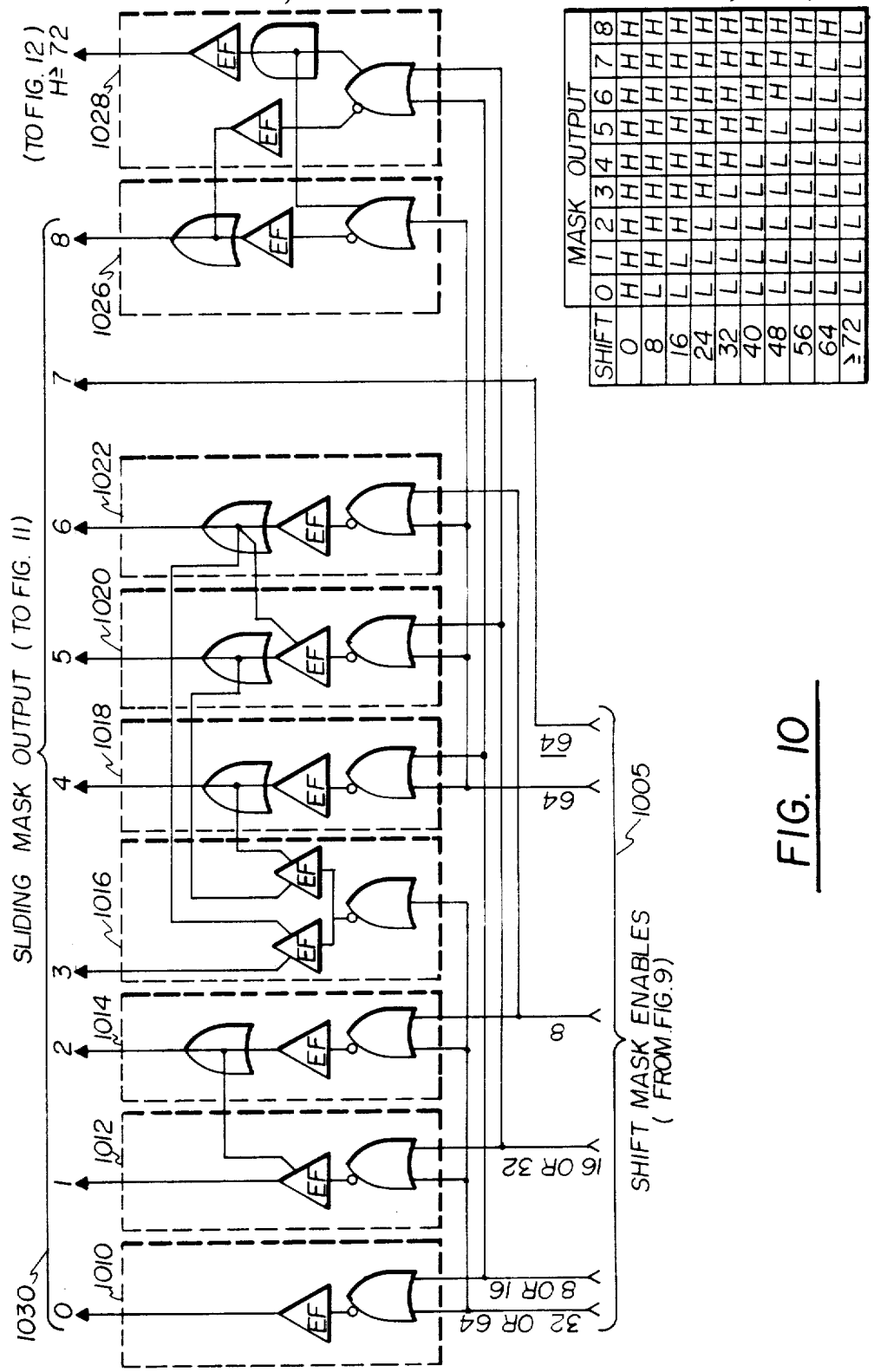
FIG. 10 is a logic diagram of the sliding mask generator.

Consider next, FIG. 10 which illustrates, in detail, the sliding mask generator. This circuit generates a mask from the left corresponding to the mask count value. It is used to mask off unwanted bits. Thus, the group of shift mask enable signals 1005 coming from the byte count converter of FIG. 9 are received in various combinations by a plurality of gating networks 1010, 1012, 1014, 1016, 1018, 1020, 1022, and 1026 to provide bits 0–8 of a sliding mask output 1030. These signals are sent to the input of the mask reversal and output circuit of FIG. 11. A separate gating network 1028 provides the direction signal H (less than or equal to) 72, which is sent to the input of the bit shift mask enable circuit shown in FIG. 12. The table shown with FIG. 10 illustrates the high (H) or low (L) output of each of the mask bits 0 to 8 for each of the bit shift amounts shown down the left side of the table.

Figure 11:
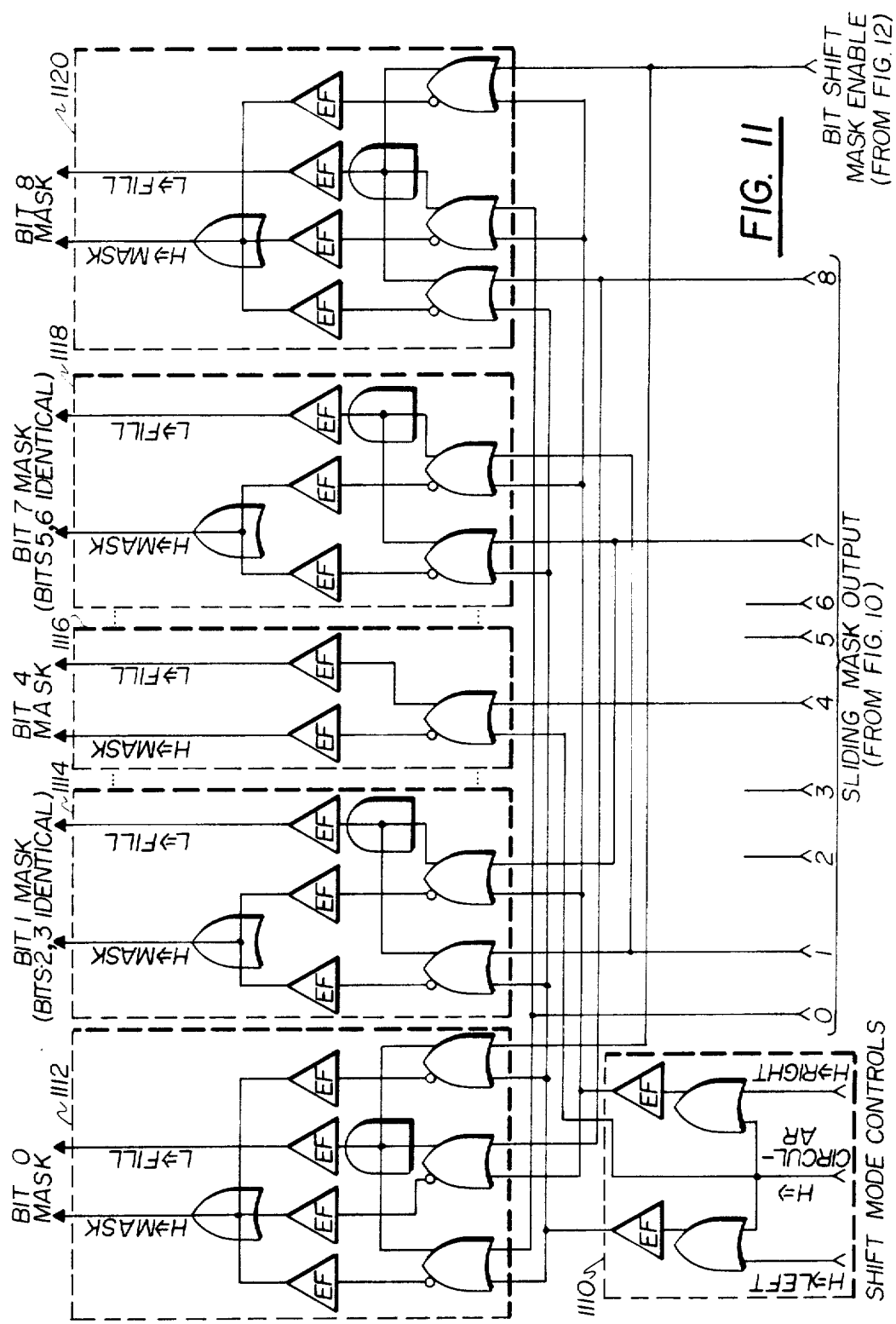
FIG. 11 is a logic diagram of the mask reversal and output circuit.

FIG. 11 illustrates the logical block diagram of the mask reversal and output circuit. As shown, the output signals from the sliding mask generator of FIG. 10 are presented to the input of FIG. 11. Also, there are three shift mode signals sent to the mask reversal and output circuit. They determine whether the circuit responds with a left, a right or a circular shift. Finally, a bit shift mask enable signal from FIG. 12 activates the circuit. Each bit of the 9-bit signal from the sliding mask circuit is sent to at least one individual logic circuit comprised of AND gates, emitter followers (EF) and OR gates. Thus, bit 0 is sent to logic circuit 1112 and logic circuit 120. Both circuits 1112 and 1120 also receive a mode signal from circuit 1110 and a bit shift enable signal to provide bit 0 mask and bit 8 mask output signals. Although not shown, bit 2 and bit 3 circuits are identical to bit 1 mask circuit 1114. Further, again, although not shown, mask bit circuits 5 and 6 are identical to the bit 7 mask circuit 1118.

Figure 12:
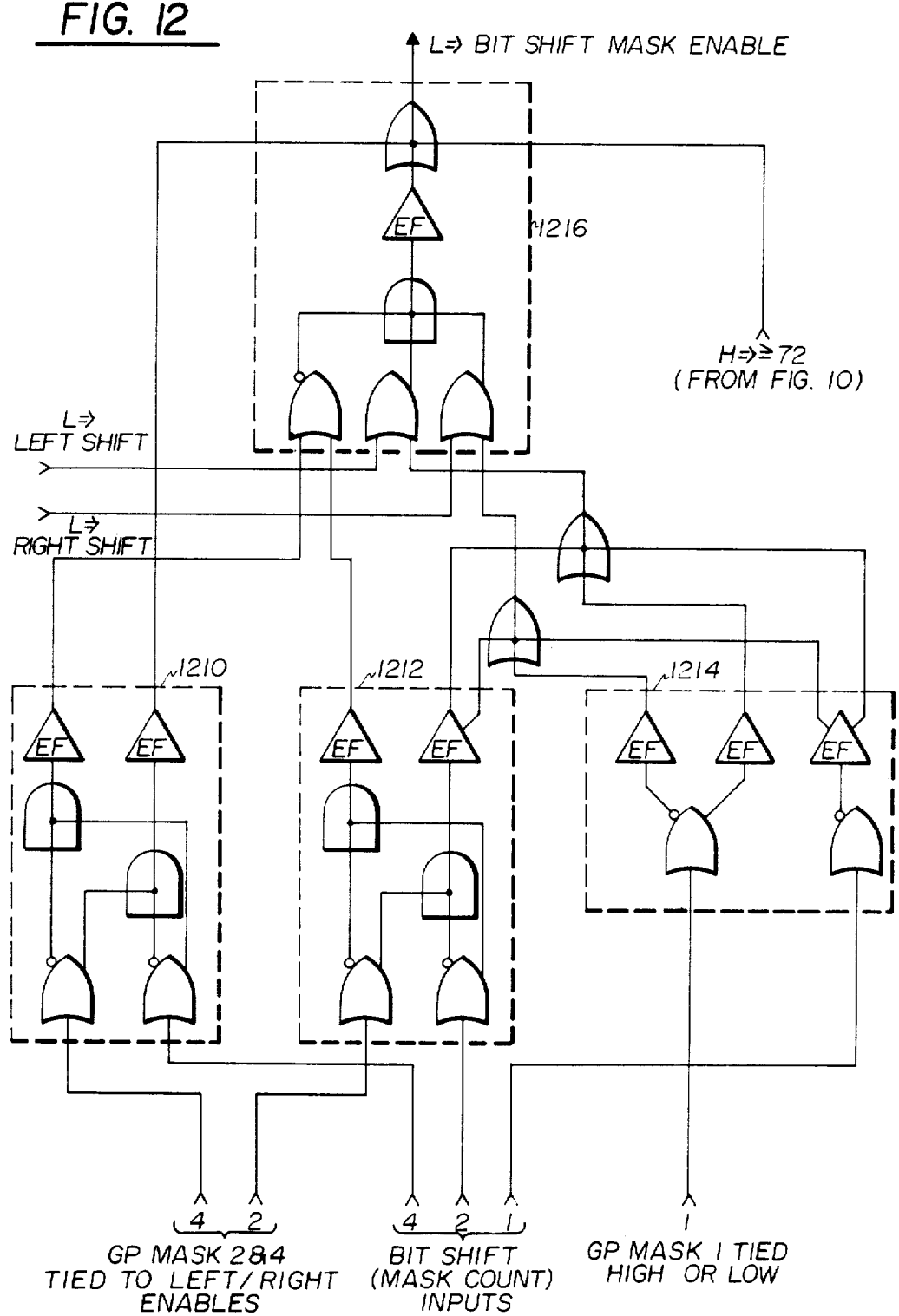
FIG. 12 is a logic diagram of the bit shift mask enable circuit.

The bit shift mask enable signal mentioned is created by the primary mask generation circuit of FIG. 12. As previously shown, the mask signals are derived from the byte count shift, however, the bit count is also used to selectively mask the rightmost bit for right shifts and the leftmost bit for left shifts to achieve the complete masking operation for the entire matrix in the byte shifter. Thus, FIG. 11 is the third section of the bit shifter mask and is the reversal circuit. It accomplishes the left shifting of the bits by complementing the bit shift count.

Next, consider FIG. 12, which illustrates the bit shift mask enable circuit. A plurality of GP Mask inputs 4, 2, and 1 are merged with bit shift inputs 4, 2 and 1 in logic circuits 1210, 1212 and 1214 respectively. Thereafter, the outputs of each of the logic circuits 1210, 1212 and 1214 are further merged together and together with left shift and right shift signals produces the bit shift mask enable output signal for use in the gated parity network of FIG. 14.

Figure 13:
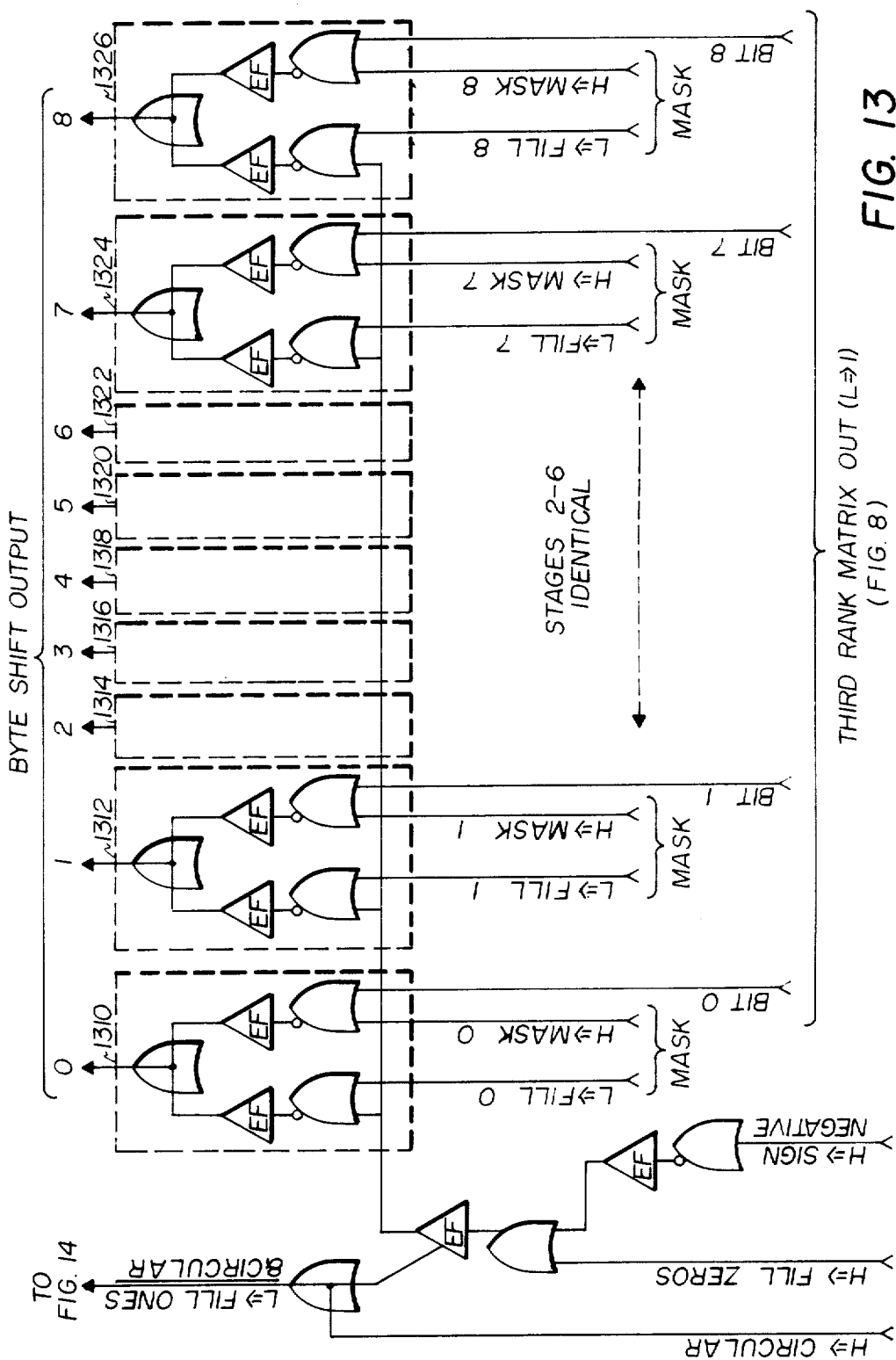
FIG. 13 illustrates, in logical diagram format, the mask/merge output circuit.
Figure 14:
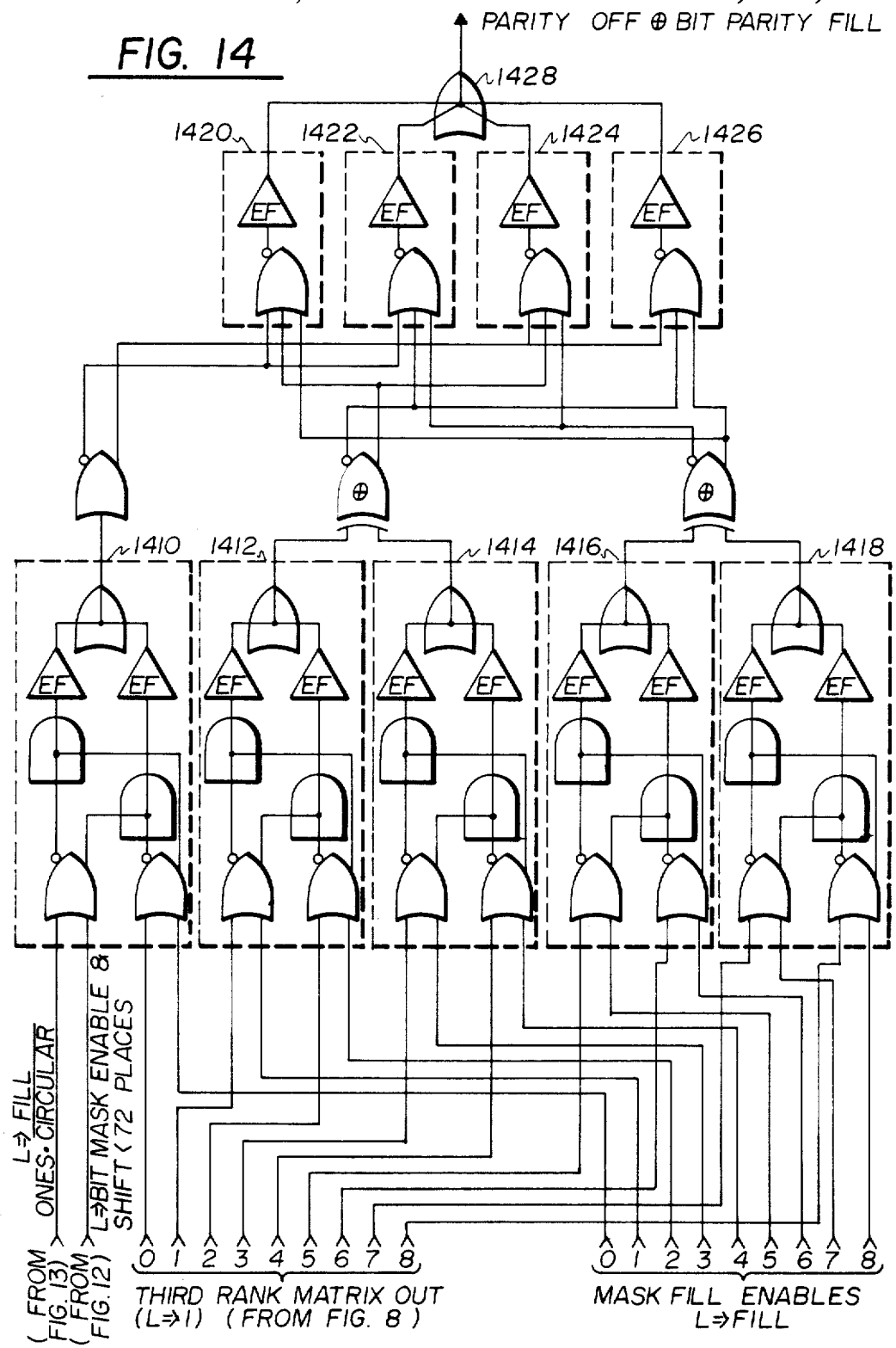
FIG. 14 illustrates the logical diagram of the gated parity network.

FIG. 13 illustrates the mask/merge section of the byte shifter design. It shows the fill condition signals L→Fill 0 to L→Fill 8 AND'ed with the compliment of the mask signals and OR'ed with the data bits 0 to 8 via circuits 1310, 1312, 1314, 1316, 1318, 1320, 1322, 1324 and 1326. Although circuits 1314 to 1322 are not shown in detail it is understood that they are identical to the shown circuits to provide the byte shift output signals. As previously mentioned both the mask generator 218 and the matrix 225 also feed the gated parity circuit network 228. This network is shown in detail in FIG. 14. Thus, in FIG. 14, the third rank 216 of the matrix 225 is shown generally in FIG. 2. FIG. 8 shows this third rank matrix in detail. Further, the fill signals from FIG. 13 and the mask enable and shift signals of FIG. 12 and the mask fill enable signals are merged via logic gates 1410, 1412, 1414, 1416 and 1418. Thereafter, these merged signals are logically combined via logic circuits 1420, 1422, 1424 and 1426 and OR gate 1428 to provide the parity off + bit parity fill output signals.

Figure 15:
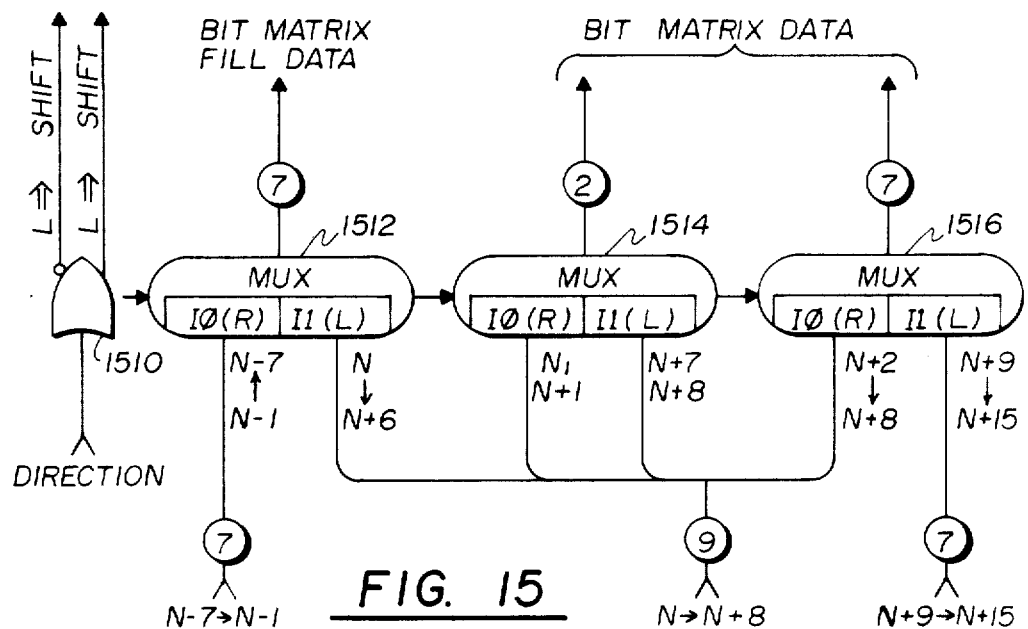
FIG. 15 is a logical block diagram of the left shift corrector circuit.

FIG. 15 is a logic diagram of the left shift bit corrector circuit. It is called herein the left 7 corrector circuit. It receives nine bits from the byte shifter corresponding to the stages being represented in the bit shifter and additionally seven adjacent bits to the left for fill on right shift operations and seven adjacent bits to the right for fill on left shifts. This rank produces an initial left shift of seven places when shifting left. Generally, this left shifter is shown in basic bit shifter of FIG. 4 as 412. It comprises a group of three multiplexers 1512, 1514 and 1516. It receives seven bits of right shift data, seven bits of left shift data and nine bits of data from the byte shifter. Direction signals are gated via gate 1510 to produce a left shift signal and its complement. The multiplexer 1512 produces bit matrix fill data output signals and the multiplexers 1514 and 1516 produce the nine bit matrix data.

Figure 16:
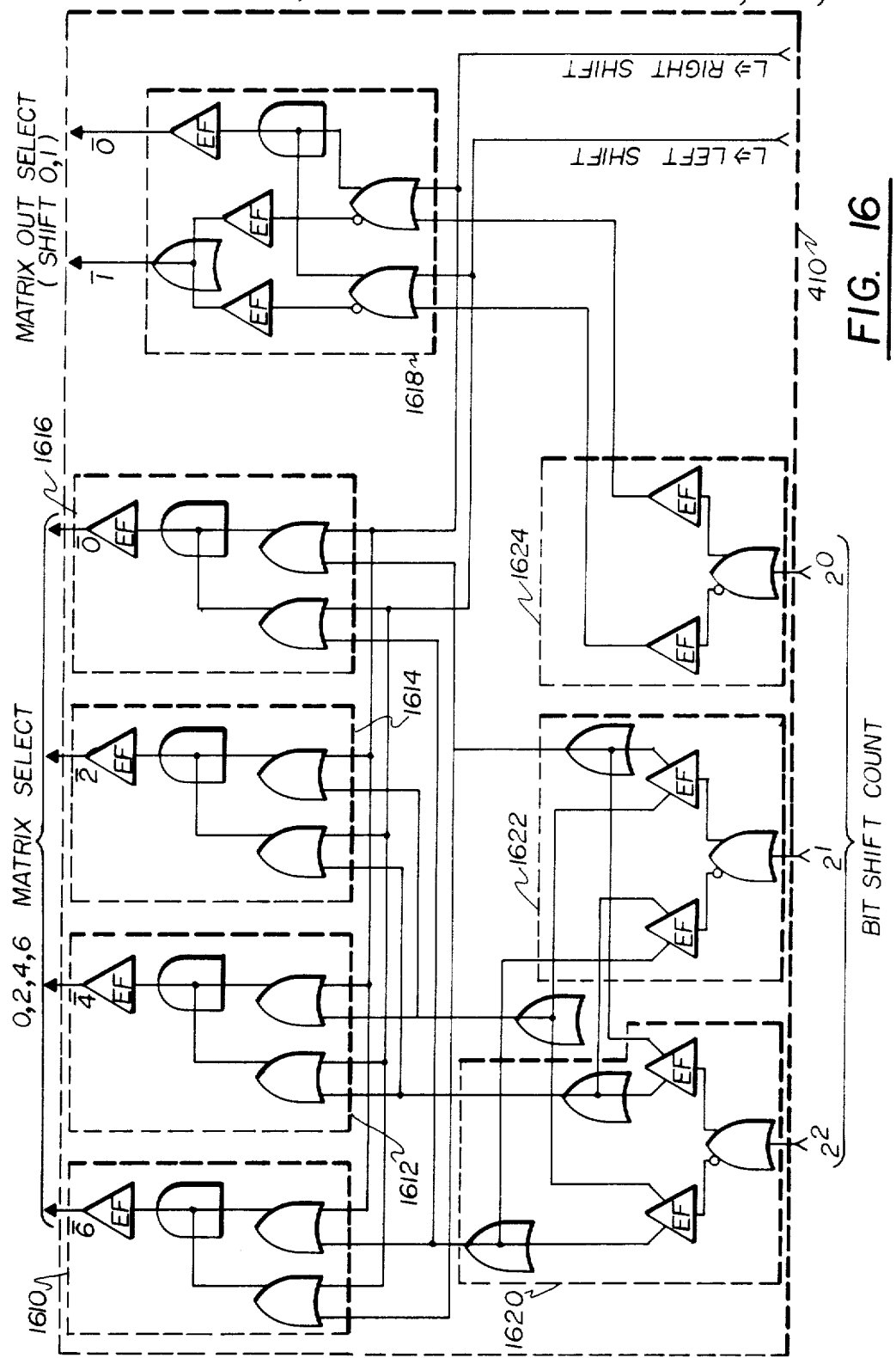
FIG. 16 is a logical block diagram of the bit count converter.

FIG. 16 is a detailed logic diagram of the bit count converter shown generally as 410 in FIG. 4. It receives the bit shift count information $2^0$, $2^1$ and $2^2$ via a first gating level comprised of logic gating networks 1620, 1622 and 1624. The $2^0$ count is merged with the left and right shift signals in gating network 1618 to produce the matrix output select shift signals 0 and 1. The $2^1$ and $2^2$ bit shift count signals are gated via gating networks 1620 and 1622 to a second gating level comprised of networks 1610, 1612, 1614 and 1616 to produce output signals 0, 2, 4 and 6 matrix select signals to be sent to matrix 425 of FIG. 4.

The overall parity prediction and logic checking network, shown generally as 418, 420 in FIG. 4, is shown in detail in FIG. 17. Thus, each of the eight bit shifters 1712 through 1726 includes a comparison gate 420 and the parity network 418. The output signals are combined in the network 1710 in the parity net and the source parity signal is compared with the predicted source parity to produce an error signal when they differ.

Finally, as previously mentioned, FIG. 18a and FIG. 18b, when arranged as in FIG. 18 illustrates the overall block diagram of the entire 72-bit shift matrix with the required interconnections of the plurality of eight bit chips 1810, 1812, 1814, 1816, 1818, 1820, 1822 and 1824 with the same plurality of eight bit shift chips 1830, 1832, 1834, 1836, 1838, 1840, 1842 and 1844 with the necessary input connections and output signals.

What has been shown and described is a 72-bit shift matrix suitable for LSI implementation in gate arrays. Eight byte shifters and eight bit shifters are combined to produce shifts of 0–72 places in either a right or a left direction, either circularly or open ended with zero or sign fill. Thru checking is accomplished by regenerating original source parity from the matrix outputs. This checking of the parity is provided using only a single nine-bit parity generator.

What is claimed is:

1. An error-checked, high speed shift matrix for use in the arithmetic portion of a contemporary data processing system comprising:
   (a) a data source means having a parity information portion;
   (b) a byte shifter capable of right or left shifting, connected to said data source means, capable of bidirectionally shifting multiple bit portions of said data received therefrom, and of producing an output signal indicative of the parity of the number of bits shifted off in either a right or a left shift;

(c) a bit shifter, connected to said byte shifter, capable of shifting single bits of said data received therefrom and of producing a predicted source parity output signal; and (d) a parity checking and error indicating comparing means commonly connected to said bit shifter and said data source means to receive predicted source parity information from said bit shifter and actual source parity information from said parity information portion of said data source, to compare said actual source parity with said predicted source parity and to provide an error indication when said comparison operation indicates inequally.

2. The invention as set forth in claim 1 wherein said byte shifter includes matrix means and count conversion means connected thereto to enable said bidirectional multiple bit shifting to be accomplished circularly or open-ended with zero or sign fill.

3. The invention as set forth in claim 1 wherein said parity checking and error indicating comparing means includes a plurality of byte shifting means commonly coupled to a parity net means which enables the incorporation of single-bit error detection without duplication and result comparison.

4. The invention as set forth in claim 2 further including means to mask and/or complement selected bits connected between byte count input means and gated parity means to thereby accomplish the bidirectional bit shifting.

5. An error-checked, high speed shift matrix for use in the arithmetic section of a data processing system comprising:

(a) a data source means capable of providing a plurality of parity signals;

(b) a plurality of byte shifters connected to receive source data and parity for providing bidirectional shifts of said source data;

(c) a plurality of bit shifters connected to said plurality of byte shifters for providing a predicated source parity signal in response to information received from said plurality of byte shifters;

(d) a single bit error detection network connected to each of said plurality of bit shifters to receive the predicted source parity signal therefrom and also connected to receive the parity signals from said source data means to thereby provide an error-checked high speed shift matrix which incorporates single bit error detection without circuit duplication and result comparison.

6. The error-checked, high speed shift matrix as set forth in claim 5 wherein each of said plurality of byte shifters comprises:

(a) a shift matrix connected to receive a plurality of n data bits and capable of shifting the bits in m bit increments;

(b) a shift count converter connected to said shift matrix to cause said matrix to shift a given number of byte positions in response to a received number of byte shift counts;

(c) a mask generator also connected to the received number of byte shift counts;

(d) a mask/merge circuit connected to the output of said shift matrix and to the output of said mask generator; and a (e) gated parity network connected to the mask generator and shift matrix whereby said byte shifter produces shifts of 0–72 places to the right in eight-bit increments and error detection is accomplished by parity through checking of the matrix.

7. The error-checked, high speed shift matrix as set forth in claim 5 wherein each of said plurality of bit shifters comprises:

(a) a left shift correction circuit connected to receive data from said byte shifter, and data for left and right shifts;

(b) a shift matrix connected to said left shift correction circuit to shift said byte data to the right in single bit increments and provide such shifted output data;

(c) a bit count converter circuit commonly connected to said shift matrix to cause data shifts of predetermined increments in said shift matrix in response to bit count signals;

(d) a parity generating network, connected to the output of said shift matrix, to provide an output parity signal from said bit shift structure; and (e) a gating circuit commonly connected to the output of the parity generating network and a source of parity-off signals to provide a predicted source parity output signal.

8. The error-checked, high speed shift matrix as set forth in claim 7 wherein said left shift correction circuit comprises:

(a) a first multiplexer circuit connected to receive input signals for the filling of those matrix locations emptied during a right shift operation;

(b) a second multiplexer circuit coupled to said first multiplexer circuit and connected to receive input data; and (c) a third multiplexer circuit coupled to said second multiplexer circuit and connected to receive input signals for the filling of those matrix locations emptied during a left shift operation.

9. A method of error detection using parity through checking of a high speed shift matrix comprising the steps of:

(a) comparing the initial source operand parity to result parity in a circular shift operation to detect single bit errors in said matrix;

(b) modifying source parity by logically subtracting the parity of the bits shifted off and logically adding bits filled on; and (c) comparing this modified source parity to result parity in an open-ended shift operation to detect an error condition in said matrix.

10. The method as set forth in claim 9 wherein said open-ended shift operation is a zero fill operation.

11. The method as set forth in claim 9 wherein said open-ended shift operation is a sign fill operation.

12. The method as set forth in claim 9 wherein the parity of bits shifted off is used to verify the shift correctness.

13. A high speed shift matrix for use in the arithmetic portion of a contemporary data processing system comprising:

(a) a first rank shifting means for producing shifts in selectable multiple bit increments;

(b) a second rank shifting means for producing shifts in selectable individual bit increments coupled to said first rank shifting means; and (c) a binary count conversion means, included in said first rank shifting means, commonly coupled to said first and said second rank shifting means to cause right shifts of data therein in response to various multiple bit counts.

14. The high speed shift matrix as set forth in claim 13 wherein said first rank shifting means is a right shifting only apparatus which accomplishes left shifts by circularly overshifting in the right direction.

15. The high speed shift rank matrix as set forth in claim 13 wherein said second rank is a bit shifter rank capable of selective right shifts of 0–7 places circularly only.

16. A method of converting the counts of a shift count means wherein the value of the bit shift count is normally considered when subtracting the count from the radix since the borrow generated by these bits must be propagated to the upper stages of a shift matrix comprising the steps of:
(a) subtracting the byte shift count from the upper bits of the overall constant;
(b) forming the bit shift count by generating the ones complement of the lower bits; and
(c) introducing an initial left shift to compensate for the difference.

17. The method of count conversion as set forth in claim 16 further comprising steps wherein bits $2^6$-$2^3$ are subtracted from the upper four bits of a constant 72, the bit shift count is formed by generating the ones complement of bits $2^2$-$2^0$; and the initial left shift introduced to compensate is seven counts.

* * * * *